(12) United States Patent
Nakayama et al.

(10) Patent No.: US 11,474,730 B1
(45) Date of Patent: Oct. 18, 2022

(54) STORAGE SYSTEM AND MIGRATION METHOD OF STORAGE SYSTEM

(71) Applicant: Hitachi, Ltd., Tokyo (JP)

(72) Inventors: Shunsuke Nakayama, Tokyo (JP); Shinichiro Kanno, Tokyo (JP); Akihito Miyazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/472,530

(22) Filed: Sep. 10, 2021

(30) Foreign Application Priority Data

Mar. 25, 2021 (JP) .............................. JP2021-051389

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0619* (2013.01); *G06F 3/0659* (2013.01); *G06F 3/0664* (2013.01)

(58) Field of Classification Search
CPC .... G06F 3/0647; G06F 3/0604; G06F 3/0619; G06F 3/0659; G06F 3/0664; G06F 3/067
See application file for complete search history.

(56) References Cited

U.S. PATENT DOCUMENTS

| | | | |
|---|---|---|---|
| 2006/0095700 A1 | 5/2006 | Sato et al. | |
| 2008/0183994 A1* | 7/2008 | Maki | G06F 3/0689 710/3 |
| 2014/0351538 A1* | 11/2014 | Kono | G06F 3/067 711/162 |
| 2015/0026421 A1* | 1/2015 | Nasu | G06F 3/0647 711/162 |

FOREIGN PATENT DOCUMENTS

JP 2006-127398 A 5/2006

* cited by examiner

*Primary Examiner* — Jason W Blust
(74) *Attorney, Agent, or Firm* — Procopio, Cory, Hargreaves & Savitch LLP

(57) ABSTRACT

A first virtual parity group management table that associates first virtual parity group management information with second virtual parity group management information using physical disk management information is created and memorized in a first sharable memory section, a second virtual parity group management table that associates logical device information, third virtual parity group management information that sets the second virtual parity group management information to virtual parity group management information regarding its own storage system, and fourth virtual parity group management information that sets the first virtual parity group management information to virtual parity group management information regarding the non-own storage system with one another is created and memorized in a second sharable memory section, and migration of a physical disk is accepted on the condition that these tables are memorized.

14 Claims, 17 Drawing Sheets

FIG. 5A

VIRTUAL PARITY GROUP MANAGEMENT INFORMATION (STORAGE A) 3711a

| LOGICAL DEVICE Pdev | PHYSICAL DEVICE Pdev OF STORAGE A | RAID GROUP NUMBER | ATTRIBUTE | VALID/INVALID |
|---|---|---|---|---|
| 21 | Pdev1 | 1-5 | Local | VALID |
| 22 | Pdev2 | 2-5 | Local | VALID |
| 23 | Pdev3 | 3-5 | Local | VALID |
| 24 | Pdev4 | 4-5 | Local | VALID |
| 25 | Pdev5 | 5-5 | Local | VALID |

VIRTUAL PARITY GROUP MANAGEMENT INFORMATION (STORAGE B) 3712a — 371(371a)

| LOGICAL DEVICE Pdev | PHYSICAL DEVICE Pdev OF STORAGE B | RAID GROUP NUMBER | ATTRIBUTE | VALID/INVALID |
|---|---|---|---|---|
| 21 | — | — | External | INVALID |
| 22 | — | — | External | INVALID |
| 23 | — | — | External | INVALID |
| 24 | — | — | External | INVALID |
| 25 | — | — | External | INVALID |

FIG. 5B

VIRTUAL PARITY GROUP MANAGEMENT INFORMATION (STORAGE B) 3711b

| LOGICAL DEVICE Pdev | PHYSICAL DEVICE Pdev OF STORAGE B | RAID GROUP NUMBER | ATTRIBUTE | VALID/INVALID |
|---|---|---|---|---|
| 21 | — | — | Local | INVALID |
| 22 | — | — | Local | INVALID |
| 23 | — | — | Local | INVALID |
| 24 | — | — | Local | INVALID |
| 25 | — | — | Local | INVALID |

VIRTUAL PARITY GROUP MANAGEMENT INFORMATION (STORAGE A) 3712b — 371(371b)

| LOGICAL DEVICE Pdev | PHYSICAL DEVICE Pdev OF STORAGE A | RAID GROUP NUMBER | ATTRIBUTE | VALID/INVALID |
|---|---|---|---|---|
| 21 | Pdev1 | 1-5 | External | VALID |
| 22 | Pdev2 | 2-5 | External | VALID |
| 23 | Pdev3 | 3-5 | External | VALID |
| 24 | Pdev4 | 4-5 | External | VALID |
| 25 | Pdev5 | 5-5 | External | VALID |

| LOGICAL WWN | PHYSICAL WWN | LdevId | PGID | LOGICAL DEVICE Pdev | PHYSICAL DEVICE Pdev |
|---|---|---|---|---|---|
| WWN10 | WWN1 | 100 | 10 | 21 | Pdev1 |
| WWN10 | WWN1 | 100 | 10 | 22 | Pdev2 |
| ... | | | | | |

| LOGICAL WWN | PHYSICAL WWN | LdevId | PGID | LOGICAL DEVICE Pdev | PHYSICAL DEVICE Pdev |
|---|---|---|---|---|---|
| WWN10 | WWN2 | 100 | 10 | 21 | - |
| WWN10 | WWN2 | 100 | 10 | 22 | - |
| ... | | | | | |

| LOGICAL WWN | PHYSICAL WWN | VALID/ INVALID |
|---|---|---|
| WWN10 | WWN1 | VALID |

| LOGICAL WWN | PHYSICAL WWN | VALID/ INVALID |
|---|---|---|
| WWN10 | WWN2 | INVALID |

| LOGICAL DEVICE Pdev | PHYSICAL DEVICE Pdev | RAID GROUP NUMBER |
|---|---|---|
| 21 | Pdev1 | 1-5 |
| ⋮ | | |

F I G. 1 3 A

VIRTUAL PARITY GROUP MANAGEMENT INFORMATION (STORAGE A) 371(371a)

| LOGICAL DEVICE Pdev | VIRTUAL PARITY GROUP MANAGEMENT INFORMATION (STORAGE A) | | | | VIRTUAL PARITY GROUP MANAGEMENT INFORMATION (STORAGE B) | | | |
|---|---|---|---|---|---|---|---|---|
| | PHYSICAL DEVICE Pdev OF STORAGE A | RAID GROUP NUMBER | ATTRIBUTE | VALID/ INVALID | PHYSICAL DEVICE Pdev OF STORAGE B | RAID GROUP NUMBER | ATTRIBUTE | VALID/ INVALID |
| 21 | Pdev1 | 1-5 | Cache | INVALID | - | - | External | INVALID |
| 22 | Pdev2 | 2-5 | Local | VALID | - | - | External | INVALID |
| 23 | Pdev3 | 3-5 | Local | VALID | - | - | External | INVALID |
| 24 | Pdev4 | 4-5 | Local | VALID | - | - | External | INVALID |
| 25 | Pdev5 | 5-5 | Local | VALID | - | - | External | INVALID |

F I G. 1 4 A

1402

VIRTUAL PARITY GROUP MANAGEMENT INFORMATION (STORAGE A)

| LOGICAL DEVICE Pdev | PHYSICAL DEVICE Pdev OF STORAGE A | RAID GROUP NUMBER | ATTRIBUTE | VALID/ INVALID |
|---|---|---|---|---|
| 21 | – | – | Local | INVALID |
| 22 | Pdev2 | 2-5 | Local | VALID |
| 23 | Pdev3 | 3-5 | Local | VALID |
| 24 | Pdev4 | 4-5 | Local | VALID |
| 25 | Pdev5 | 5-5 | Local | VALID |

3711a

VIRTUAL PARITY GROUP MANAGEMENT INFORMATION (STORAGE B) 371(371a)

| PHYSICAL DEVICE Pdev OF STORAGE B | RAID GROUP NUMBER | ATTRIBUTE | VALID/ INVALID |
|---|---|---|---|
| Pdev6 | 1-5 | External | VALID |
| – | – | External | INVALID |
| – | – | External | INVALID |
| – | – | External | INVALID |
| – | – | External | INVALID |

3712a

F I G. 1 4 B

1401

VIRTUAL PARITY GROUP MANAGEMENT INFORMATION (STORAGE B)

| LOGICAL DEVICE Pdev | PHYSICAL DEVICE Pdev OF STORAGE B | RAID GROUP NUMBER | ATTRIBUTE | VALID/ INVALID |
|---|---|---|---|---|
| 21 | Pdev6 | 1-5 | Local | VALID |
| 22 | – | – | Local | INVALID |
| 23 | – | – | Local | INVALID |
| 24 | – | – | Local | INVALID |
| 25 | – | – | Local | INVALID |

3711b

VIRTUAL PARITY GROUP MANAGEMENT INFORMATION (STORAGE A) 371(371b)

| PHYSICAL DEVICE Pdev OF STORAGE A | RAID GROUP NUMBER | ATTRIBUTE | VALID/ INVALID |
|---|---|---|---|
| – | – | External | INVALID |
| Pdev2 | 2-5 | External | VALID |
| Pdev3 | 3-5 | External | VALID |
| Pdev4 | 4-5 | External | VALID |
| Pdev5 | 5-5 | External | VALID |

3712b

STORAGE SYSTEM AND MIGRATION METHOD OF STORAGE SYSTEM

BACKGROUND OF THE INVENTION

The present invention relates to technologies for migrating a storage system.

Conventionally, technologies used for the replacement of a storage system with another storage system such as a technology for migrating a storage system from a migration source storage system to a migration destination storage system have been studied in a storage system including both a migration source storage system and migration destination storage system. For example, Japanese Unexamined Patent Application Publication No. 2006-127398 discloses a technology in which conversion processing, which adapts the configuration information of a migration source storage system that can be recognized by a host apparatus such as a logical path to a migration destination storage system, is performed, and data is copied from the migration source storage system to the migration destination storage system through a communication channel such as a fiber channel.

SUMMARY OF THE INVENTION

In the technology disclosed in Japanese Unexamined Patent Application Publication No. 2006-127398, since data is copied from the migration source storage system to the migration destination storage system through a communication channel, if the bandwidth of the relevant communication channel is not sufficiently large or the size of the data to be copied from the migration source storage system is very large, the copy processing takes a large amount of time and the maintenance cost increases. Furthermore, new disks need to be prepared in the migration destination storage system for copying the data, which increases physical costs.

Therefore, an object of the present invention is to provide a storage system and the migration method of the storage system that enable a storage system migration at a low cost and at a high speed even in the case where the bandwidth of a communication channel for the migration is not sufficiently large or new disks cannot be prepared in a migration destination storage system.

In order to realize the abovementioned object, a storage system according to an aspect of the present invention is configured to includes a first storage system that is a migration source virtual storage system and a second storage system that is a migration destination virtual storage system, wherein the first storage system includes a first memory section that can be shared with the second storage system, and a first virtual parity group management section that creates a first virtual parity group management table that associates first virtual parity group management information that shows logical and physical configurations of the first storage system that is its own storage system with second virtual parity group management information that shows logical and physical configurations of the second storage system that is a non-own storage system using physical disk management information for associating logical device information, physical device information, and parity information of logical devices identified by the relevant logical device information with one another, and memorizes the first virtual parity group management table in the first memory section; the second storage system includes a second memory section that can be shared with the first storage system, and a second virtual parity group management section that creates a second virtual parity group management table that associates the logical device information, third virtual parity group management information that sets the second virtual parity group management information to virtual parity group management information regarding its own storage system, and fourth virtual parity group management information that sets the first virtual parity group management information to virtual parity group management information regarding the non-own storage system with one another, and memorizes the second virtual parity group management table in the second memory section; and the storage system accepts migration of a physical disk on the condition that the first virtual parity group management table is memorized in the first memory section and the second virtual parity group management table is memorized in the second memory section.

According to the present invention, even in the case where the bandwidth of a communication channel for migration is not sufficiently large or new disks cannot be prepared in a migration destination storage system, a storage system migration can be performed at a low cost and at a high speed.

BRIEF DESCRIPTION OF THE DRAWINGS

FIG. 5A is a diagram showing an example of a virtual parity group management table stored in a memory in the migration source storage system;

FIG. 5B is a diagram showing an example of a virtual parity group management table stored in a memory in the migration destination storage system;

FIG. 6A a diagram showing an example of a resource address management table stored in the memory of the migration source storage system;

FIG. 6B is a diagram showing an example of a resource address management table stored in the memory of the migration destination storage system;

FIG. 7A is a diagram showing an example of a WWN management table stored in the memory of the migration source storage system;

FIG. 7B is a diagram showing a WWN management table stored in the memory of the migration destination storage system;

FIG. 8 is a diagram showing an example of a management information table held by a physical disk;

FIG. 13A is a diagram showing an example of the virtual parity group management table updated at S1202;

FIG. 14A is a diagram showing an example of the virtual parity group management table stored in the memory in the migration source storage system that is updated at S1204;

FIG. 14B is a diagram showing an example of the virtual parity group management table stored in the memory in the migration destination storage system that is updated at S1204;

DETAILED DESCRIPTION OF THE PREFERRED EMBODIMENTS

Figure 1:
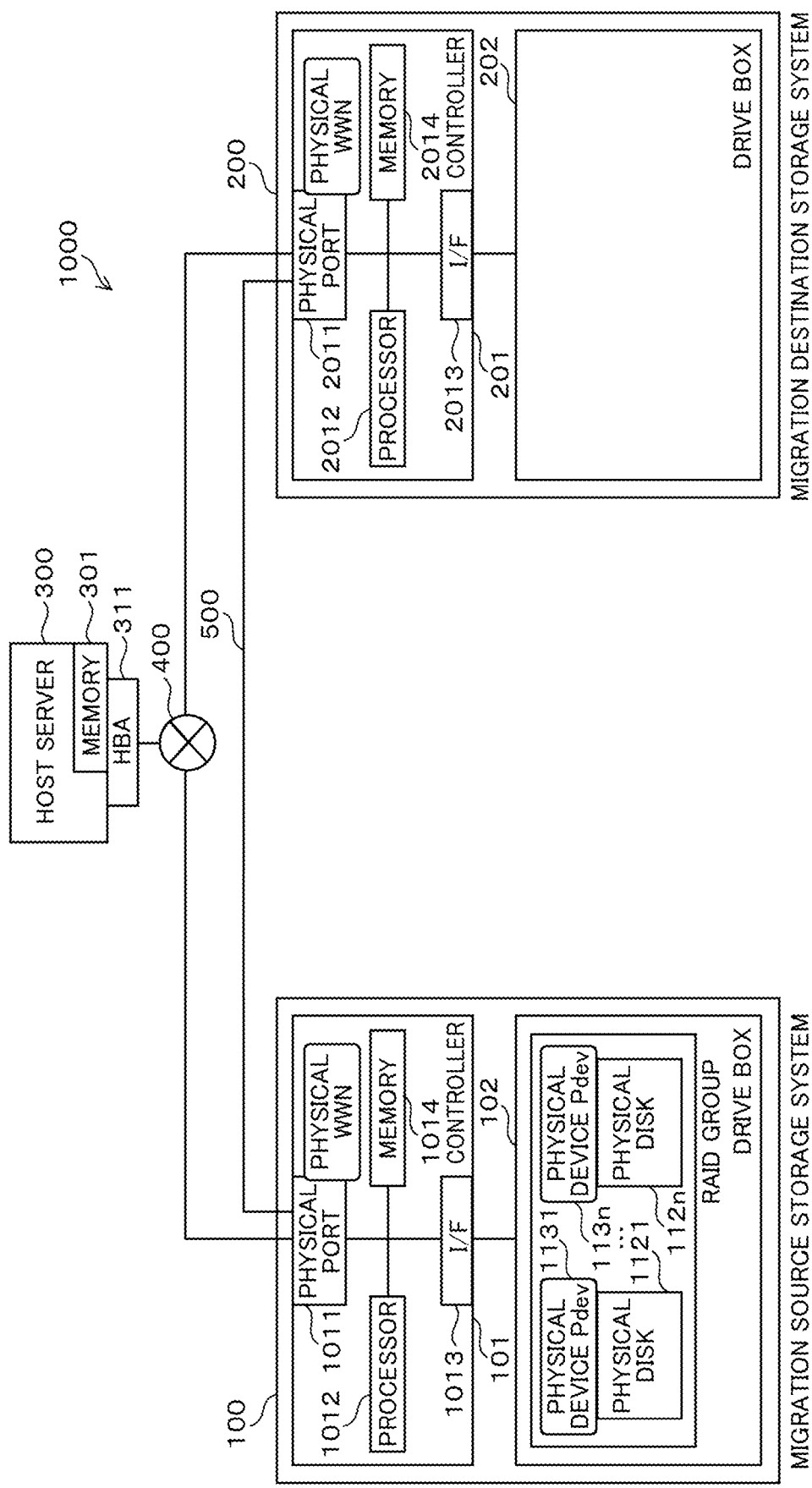
FIG. 1 is a diagram showing an example of a physical configuration of a storage system.

Hereinafter an embodiment will be explained with reference to the accompanying drawings. In addition, in the following explanations, although various kinds of information are explained by representing these kinds of information by "tables" in some cases, these kinds of information can be represented by data structures other than the "tables". Furthermore, a "table" is sometimes referred to as "management information" in order to show that any information can be represented independently of a specified data structure.

In addition, when a certain kind of processing is explained, there is the case where a "program" acts as a host for performing the certain kind of processing. In fact, the program is executed by a processor, which is a processing section, such as an MP (Micro Processor) or a CPU (Central Processing Unit), so that the program performs a predefined piece of processing. Here, since a processor performs the piece of processing using memory resources (for example, memories) and communication interface devices (for example, communication ports) accordingly, it is conceivable that a host for performing the piece of processing is the processor or a processing section. The processor may include dedicated hardware other than a CPU. Computer programs may be installed in plural computers from a program source. The program source may be provided from a program distribution server or a storage medium.

Furthermore, although, in the drawings and descriptions of the present embodiment, the same portions are given the same reference signs, the present invention is not restricted to the present embodiment, and it should be understood that all application examples that conform to the idea of the present invention fall within the technical scope of the present invention. In addition, it is all right that the number of components of the same type used in the present embodiment is one or more unless otherwise specified.

<System Configuration>

FIG. 1 is a diagram showing an example of a physical configuration of a storage system according to the present embodiment. As shown in FIG. 1, a storage system 1000 includes: a migration source storage system 100 in which physical disks, which are migration targets, are stored; a migration destination storage system 200 to which the physical disks, which are the migration targets, are migrated; and a host server 300 that manages the migration source storage system 100 and the migration destination storage system 200, and these 300 are connected to one another via a network 400. Furthermore, the migration source storage system 100 and the migration destination storage system 200 are connected to each other via a network 500. As the network 400 or the network 500, a fiber channel or an iSCSI can be used.

The migration source storage system 100 physically includes a controller 101 that performs controls such as writing or reading related to physical disks stored in the migration source storage system, and a drive box 102 that stores plural physical disks that composes RAID (Redundant Arrays of Independent Disks) groups.

The controller 101 physically includes: a physical port 1011; a processor 1012; an interface (I/F) 1013; and a memory 1014.

The physical port 1011 is a communication interface used for connecting to the network 400. The physical port 1011 is a port identified by a physical WWN (World Wide Identifier).

The processor 1012 is hardware that performs the above-mentioned controls in the migration source storage system 100. Concrete controls performed by the processor 1012 in the present embodiment will be described later.

The interface (I/F) 1013 is a communication interface used for connecting the controller 101 and the drive box 102.

The memory 1014 is a storage medium for storing programs and data executed by the processor 1012. Concrete examples of the programs and the data stored in the memory 1014 will be described later.

The drive box 102 is a steel case for storing physical disks. A sensor (not shown) for detecting that a physical disk is inserted and stored in the drive box 102 or a physical disk is removed from the drive box 102 is installed in a predefined position in the drive box 102.

As shown in FIG. 1, plural physical disks 1121 to 112$n$ are stored in the drive box 102. These physical disks are recognized by the controller 101 as physical devices Pdev (physical device information) 1131 to 113$n$ each of which logically represents a physical device. In the following, descriptions will be made about a RAID group on the premise that the RAID group including five physical devices Pdev 1131 to 1135 corresponding to three physical disks and two parity disks compose RAID 6, but it is also thinkable that migration is performed not only on the RAID group composing RAID 6, but also on a RAID group composing RAID 4, RAID 5, or the like. In addition, each of the physical devices Pdev 1131 to 113$n$ in the migration source may be represented with a subscript "a" added such as the physical device Pdev 1131$a$ in the following descriptions. Furthermore, each of the physical devices Pdev 1131 to 113$n$ in the migration destination may be represented with a subscript "b" added such as the physical device Pdev 1131$b$ in the following descriptions.

The migration destination storage system 200 includes the same sections as those included in the migration source storage system 100. In other words, the migration destination storage system 200 physically includes a controller 201 and a drive box 202 in which plural physical disks 2021 composing a RAID group.

The controller 201 physically includes: a physical port 2011; a processor 2012; an interface (I/F) 2013; and a memory 2014. Since the functions of these components are similar to those included in the migration source storage system 100, explanations about them are omitted. FIG. 1 shows that the drive box 202 of the migration destination storage system 200 is empty with none of the physical disks 1121 to 1125 of the migration source storage system 100 stored.

Figure 2:
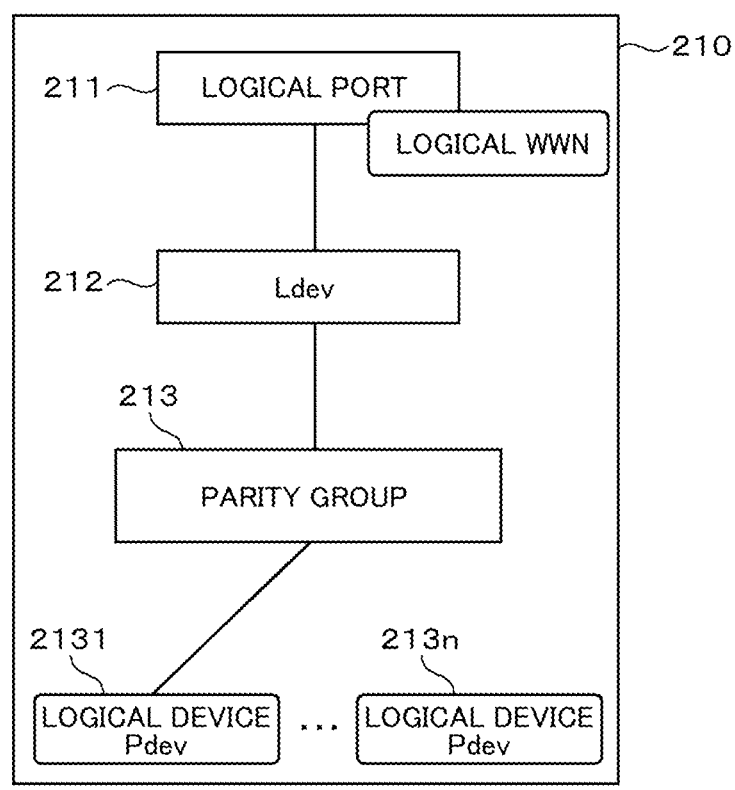
FIG. 2 is a diagram showing an example of the logical configuration of a migration source storage system or that of a migration destination storage system.

FIG. 2 is a diagram showing an example of the logical configuration of the migration source storage system or that of the migration destination storage system. A virtual storage is configured using a logical configuration as shown in FIG. 2. Although explanations are made about the migration source storage system 100 using FIG. 2, it is thinkable that explanations about the migration destination storage system 200 are the same.

As shown in FIG. 2, a virtual storage 210 includes: a logical port 211; an Ldev (logical device) 212; a parity group 213; and logical devices Pdev 2131 to 213n. The virtual storage 210 is recognized as the volume of a data storage destination by the host server 300. The logical devices Pdev show logical device information that logically represents physical devices (for example, physical disks).

The logical port 211 is a logical communication port corresponding to the physical port 1011. The logical port 211 is a port identified by a logical WWN. The Ldev 212 is a logical volume in the virtual storage 210. The parity group 213 is an aggregation of logical volumes managed under the Ldev 212. The parity group 213 is a group for composing RAID using the logical devices Pdev. In the present embodiment, although explanations will be made assuming that RAID 6 composed of 3 D and 2 P is used, the explanations can be made on the premise that a group composed of 4 D and 1 P is used. The logical devices Pdev 2131 to 213n compose an aggregation of logical drives managed under the parity group 213. The logical configuration and physical configuration of the migration source storage system 100 are associated with each other using various tables to be described later.

In the following descriptions, the virtual storage 210 in the migration source may be represented with a subscript "a" added such as the virtual storage 210a. Each of the logical port 211, the Ldev 212, the parity group 213, and the logical devices Pdev 2131 to 213n may also be represented with the same subscript "a" added. In addition, in the following descriptions, the virtual storage 210 in the migration destination may be represented with a subscript "b" added such as the virtual storage 210b. Each of the logical port 211, the Ldev 212, the parity group 213, and the logical devices Pdev 2131 to 213n may also be represented with the same subscript "b" added.

Figure 3:
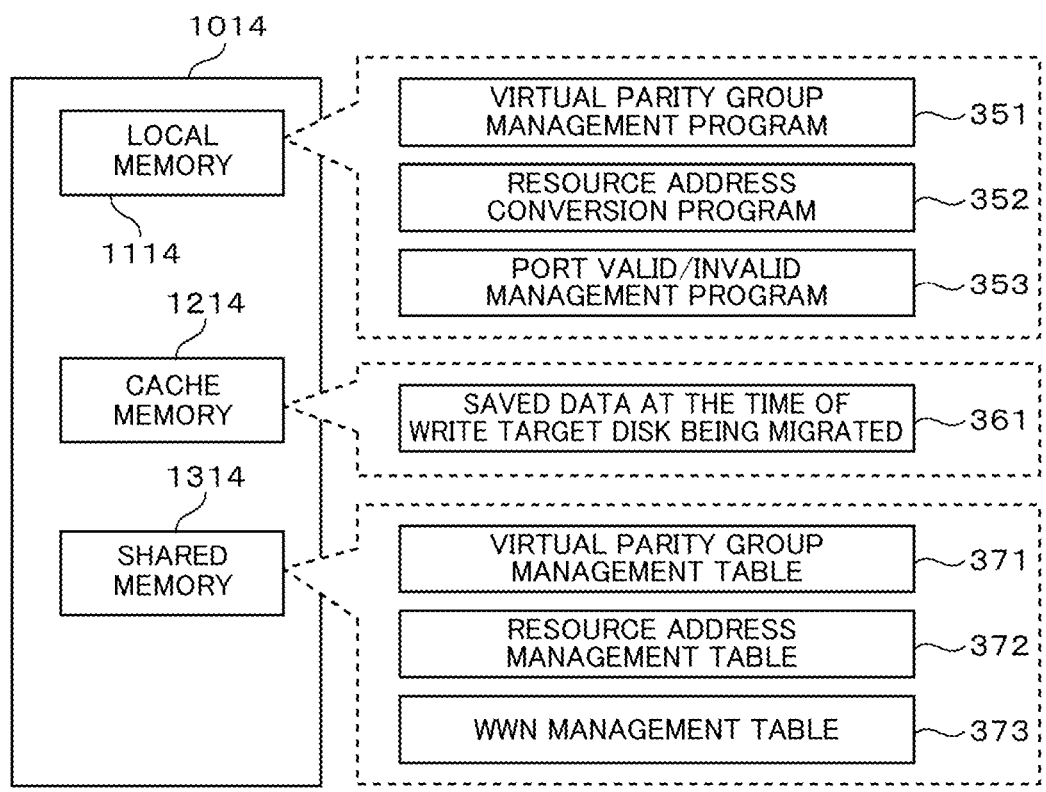
FIG. 3 is a diagram showing an example of the configuration of a memory included in a controller.

FIG. 3 is a diagram showing examples of the configuration of the memory 1014 included in the controller 101. As shown in FIG. 3, the memory 1014 includes: a local memory 1114 including a region for storing a virtual parity group management program 351, a resource address conversion program 352, and a port valid/invalid management program 353; a cache memory 1214 including a region for storing saved data 361 at the time of a write target disk being migrated; and a shared memory 1314 including a region for storing a virtual parity group management table 371, a resource address management table 372, and a WWN management table 373.

The virtual parity group management program 351, the resource address conversion program 352, and the port valid/invalid management program 353 are read and executed by the processor 1012. Concrete pieces of processing respectively performed by these programs will be described later using flowcharts.

Hereinafter, when explanations are made about these programs, any program in the migration source storage system may be represented with a subscript "a" added in such a way that the virtual parity group management program 351 is represented as the virtual parity group management program 351a, for example. Furthermore, when explanations are made about programs in the migration destination storage system, any program in the migration destination storage system may be represented with a subscript "b" added in such a way that the virtual parity group management program 351 is represented as the virtual parity group management program 351b, for example. In explanations about other programs and tables, each of the other programs and tables may be represented with a subscript "a" or "b" added in the same way as mentioned above.

Figure 4:
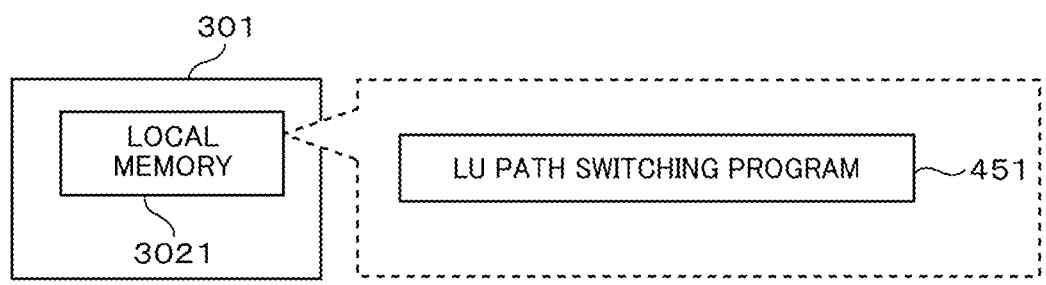
FIG. 4 is a diagram showing an example of the configuration of a memory included in a host server.

FIG. 4 is a diagram showing an example of the configuration of a memory 301 included in the host server 300. As shown in FIG. 4, the memory 301 includes a local memory 3011 including a region for storing an LU path switching program 451. Although not especially shown in FIG. 1, the host server 300 includes a CPU, and storage devices such as an HDD (Hard Disk Drive), and an SSD (Solid State Drive) as is the case with a typical computer. The CPU executes the LU path switching program 451 stored in the memory 301, so that the functions of the relevant program are realized. Here, it is also conceivable that the host server 300 is composed of SDSs (Software Defined Storages). In addition, although the host server 300 is composed of one computer for the sake of simplicity in FIG. 1 as an example, the host server 300 can be composed of plural computers on a cloud or a virtual computer using the resources of plural computers on a cloud. The host server 300 is connected to the migration source storage system 100 and the migration destination storage system 200 via an HBA (Host Bus Adapter) 311.

FIG. 5A and FIG. 5A show a diagram showing an example of a virtual parity group management table 371 composed of a virtual parity group management table 371a and a virtual parity group management table 371b. The virtual parity group management table 371 is a table for memorizing information used for forming a virtual parity group that exists across the migration source storage system 100 and the migration destination storage system 200.

FIG. 5A is a diagram showing an example of a virtual parity group management table 371 (371a) stored in a memory 1014 in the migration source storage system 100, and FIG. 5B is a diagram showing an example of a virtual parity group management table 371 (371b) stored in a memory 2014 in the migration destination storage system 200. In the following descriptions, the migration source storage system 100 is simply represented by the storage A, and the migration destination storage system 200 is simply represented by the storage B for the sake of simplicity in some cases.

As shown in FIG. 5A, in the virtual parity group management table 371a, a migration source virtual parity group management information 3711a including the items of Logical Device Pdev of Storage A, the items of Physical Device Pdev of Storage A, the items of RAID Group Number, the items of Attribute for the relevant physical devices Pdev, and the items of Valid/Invalid for the relevant physical devices Pdev, and a migration destination virtual party group management information 3712a including the items of Physical Device Pdev of Storage B, the items of RAID Group Number, the items of Attribute for the relevant physical devices Pdev, and the items of Valid/Invalid for the relevant physical devices Pdev are memorized in such a way that these items are associated with one another. The migration source virtual party group management information and the migration destination virtual party group management information are information showing the physical configuration of the migration source storage system and information showing the physical configuration of the migration destination storage system respectively, and each of the migration source virtual party group management information and the migration destination virtual party group management information is information stipulated for forming the virtual parity group across the migration source storage system and the migration destination storage system. Here, RAID group number "Y-X" means that the relevant physical disk is a Yth disk when the number of physical disks composing the RAID is X.

In the migration source virtual parity group management information 3711a in FIG. 5A, a logical device Pdev identified by, for example, "21" is associated with a physical device Pdev "Pdev1" of the storage A belonging to a RAID group number "1-5". Furthermore, the physical device Pdev "Pdev1" is associated with "Local" showing that the physical device Pdev "Pdev1" is physically stored in the drive box 102 of the storage A that is its own storage system, and also associated with "Valid", which shows that the host server 300 can access the physical device Pdev "Pdev1" via a communication channel such as a bus. In addition, in the migration destination virtual parity group management information 3712a, "-", which means "not yet set", is assigned to each term of Physical Device Pdev of storage B and "-" is also assigned to each term of RAID Group Number of the storage B, and "External" is assigned to the physical device Pdev identified by "Pdev1", where "External" means that the physical device Pdev "Pdev1" is physically stored in the storage B that is the non-own storage system, and also "Invalid" is assigned to the physical device Pdev "Pdev1", which shows that the host server 300 cannot access the physical device Pdev "Pdev1" via a communication channel such as a bus.

In addition, as shown in FIG. 5B, in the virtual parity group management table 371b, a migration destination virtual party group management information 3711b including the items of Logical Device Pdev that are the same as the items of Logical Device Pdev in the virtual parity group management table 371a, the items of Physical Device Pdev of Storage B, the items of RAID Group Numbers, the items of Attributes for the relevant physical devices Pdev, and the items of Valid/Invalid for the relevant physical devices Pdev, and a migration destination virtual party group management information 3712b including the items of Physical Device Pdev of Storage A, the items of RAID Group Number, the items of Attribute for the relevant physical devices Pdev, and the items of Valid/Invalid for the relevant physical devices Pdev are memorized in such a way that these items are associated with one another.

In the migration destination virtual parity group management information 3711b in FIG. 5B, "-", which means "not yet set", is assigned to each of a physical device Pdev and a RAID group number of the storage B corresponding to a logical device Pdev identified by, for example, "21", and the attribute of the relevant physical device Pdev is "Local" showing that the physical device Pdev is physically stored in the drive box 202 of the storage B that is its own storage system, and also "Invalid" is assigned to the physical device Pdev, which shows that the host server 300 cannot access the physical device Pdev via a communication channel such as a bus. Furthermore, in the migration source virtual parity group management information 3712b, it is shown that a physical device Pdev "Pdev1" of the storage A belonging to a RAID group number "1-5" is associated with, for example, a logical device Pdev "21". Furthermore, "External" is assigned to the relevant physical device Pdev "Pdev1", where "External" means that the physical device Pdev "Pdev1" is physically stored in the drive box 102 of the storage A that is the non-own storage system, and also "Valid" is assigned to the physical device Pdev "Pdev1", which shows that the host server 300 can access the physical device Pdev "Pdev1" via a communication channel such as a bus.

Although FIG. 5A and FIG. 5B show examples of the virtual parity group management tables in a condition that a physical disk has not been migrated yet, if a physical disk is detected in the migration destination storage system along with the migration of the physical disk, the contents of the virtual parity group management table 371 (for example, Physical Device Pdev of the storage B in the migration destination parity group management information 3711b) are updated as described later. To put it more concretely, a management information table 801 (to be described later) held in the physical disk is read at the timing of when the physical disk is inserted into and stored in the drive box of the migration destination storage system and the physical disk is detected by an unshown sensor. Successively, the virtual parity group management table of the migration destination storage system is updated using information included in the read management information table 801 (to be described later). With this, only physically migrating a disk makes it possible to bring in the configuration information of a virtual parity group and the like in the migration destination storage system.

FIG. 6A and FIG. 6A show a diagram showing an example of a resource address management table 372 composed of a resource address management table 372a and a resource address management table 372b. The resource address management table 372 is a table for memorizing information regarding the resources of the migration source storage system or the migration destination storage system.

FIG. 6A shows the resource address management table 372 (372a) stored in the memory 1014 of the migration source storage system 100, and FIG. 6B shows the resource address management table 372 (372b) stored in the memory 2014 of the migration destination storage system 200.

As shown in FIG. 6A, the resource address management table 372a memorizes logical WWNs, physical WWNs, Ldev IDs, virtual parity group IDs (PG IDs), logical devices Pdev, and physical devices Pdev in such a way that the individual items in the same row of the resource address management table 372a are associated with one another. FIG. 6A shows that, for example, a physical device Pdev "Pdev1" of the storage A is associated with a logical device Pdev "21" belonging to a PGID "10", and the PGID "10" is associated with an Ldev "100" belonging to a logical WWN "WWN10" corresponding to a physical WWN "WWN1". Although omitted in FIG. 6A, physical Devices Pdev "Pdev2" to "Pdev5" of the storage A are memorized in this table as is the case with the physical device Pdev "Pdev1".

In addition, as shown in FIG. 6B, pieces of information similar to those memorized in the resource address management table 372a are memorized in the resource address management table 372b. As described later, however, items different from the items assigned to the physical WWNs in the resource address management table 372a are assigned to physical WWNs in the resource address management table 372b. FIG. 6B shows that "WWN2" is assigned to each of the physical WWNs of the migration destination storage system 200.

Although FIG. 6A and FIG. 6B show examples of the resource address management tables in a condition that a physical disk has not been migrated yet, if a physical disk is detected in the migration destination storage system along with the migration of the physical disk, the contents of the resource address management table 372 (for example, Physical Device Pdev of the resource address management table 372b) are updated as described later.

FIG. 7A and FIG. 7A show a diagram showing an example of a WWN management table 373 composed of a WWN management table 373a and a WWN management table 373b. The WWN management table 373a and the WWN management table 373b are tables for memorizing information about the WWN of the migration source storage system and information about the WWN of the WWN management table 373b respectively.

FIG. 7A shows a WWN management table 373 (373a) stored in the memory 1014 of the migration source storage system 100, and FIG. 7B shows a WWN management table 373 (373b) stored in the memory 2014 of the migration destination storage system 200. In the following descriptions, the migration source storage system 100 is simply represented by the storage A, and the migration destination storage system 200 is simply represented by the storage B for the sake of simplicity.

As shown in FIG. 7A, the WWN management table 373a memorizes a logical WWN and a physical WWN of the storage A, and validity/invalidity of the relevant physical WWN in such a way that the individual items are associated with one another. FIG. 7A shows, for example, that the logical WWN "WWN10" associated with the physical WWN of the storage A identified by "WWN1" can be connected validly to the host server 300.

Furthermore, as shown in FIG. 7B, information similar to the information memorized in the WWN management table 373a is memorized in the WWN management table 373b. However, an item "WWN2" different from the item assigned to Physical WWN in the WWN management table 373a is assigned to Physical WWN in the WWN management table 373b, and an item "Invalid" is assigned to Valid/Invalid. As described later, when all physical disks are migrated from the migration source storage system to the migration destination storage system, "Valid" is assigned to Valid/Invalid instead of "Invalid".

FIG. 8 is a diagram showing an example of the management information table 801 held in a physical disk. The management information table 801 is a table for memorizing management information showing the logical and physical configurations of the physical disk itself. The management information table 801 is defined in advance by an administrator or others.

As shown in FIG. 8, items assigned to Logical Device Pdev, Physical Device Pdev, and RAID Group Number are memorized in such a way that these items are associated with one another. In FIG. 8, for example, Physical Device Pdev identified by "Pdev1" that belongs to RAID Group Number "1-5" is recognized as Logical Device Pdev "21". In FIG. 8, although a physical disk identified by "Pdev1" is explained, physical disks identified by "Pdev2" to "Pdev5" respectively hold management information tables 801 including Logical Device Pdev "22" to "25" and RAID Group Number "2-5" to "5-5" respectively.

Figure 9:
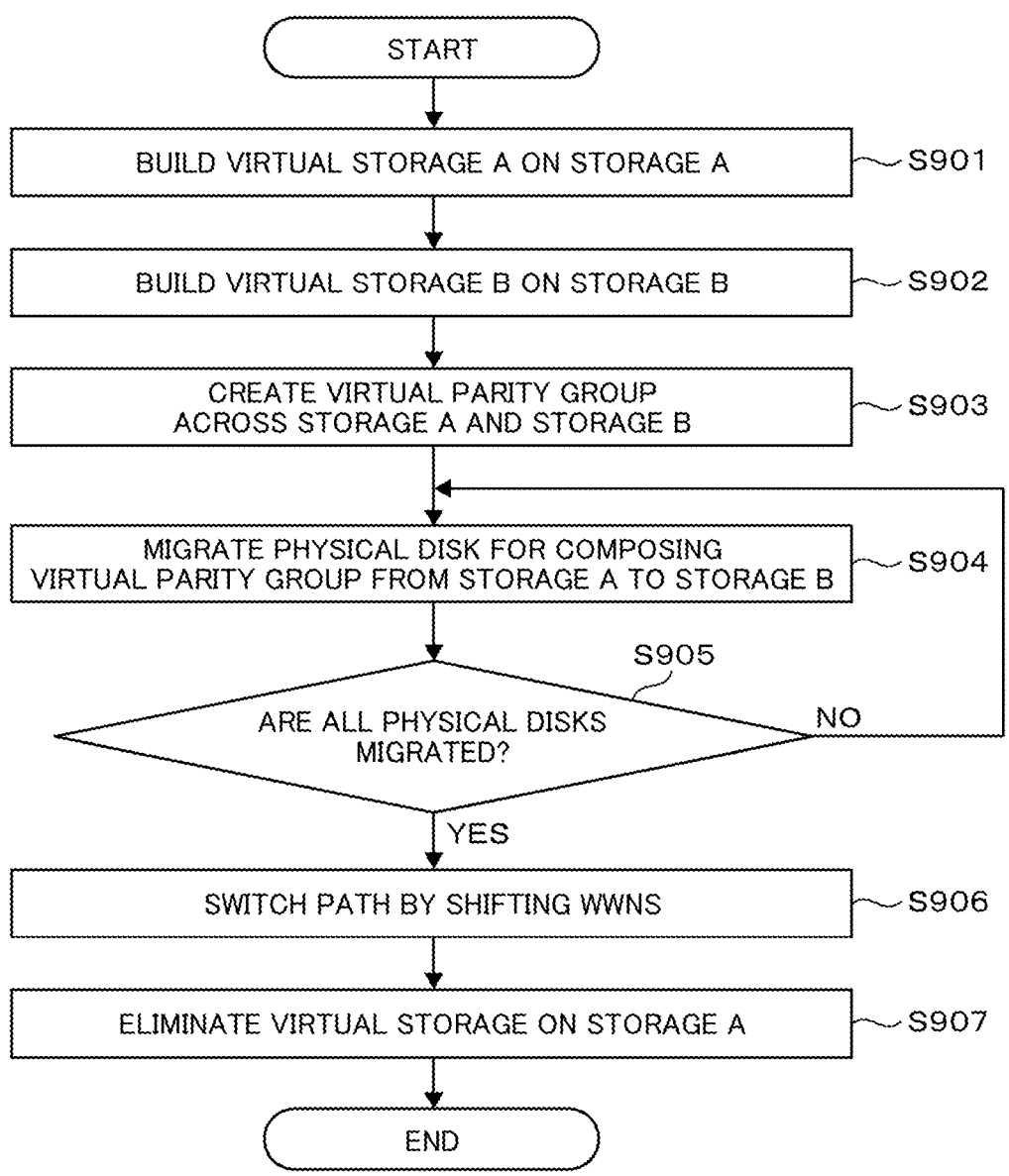
FIG. 9 is a flowchart showing an example of storage system migration processing.

Successively, a migration method of a storage system will be explained. FIG. 9 is a flowchart showing an example of the processing procedure of a storage system migration method (storage system migration processing).

As shown in FIG. 9, in the storage system migration processing, first, the controller 101 of the storage A builds a migration source virtual storage (virtual storage A) on the storage A (S901). To put it concretely, the resource address conversion program 352 creates a resource address management table 372a, and the port valid/invalid management program 353 creates a WWN management table 373a according to an administrator's instruction.

Next, the controller 101 of the storage A copies the created resource address management table 372a and WWN management table 373a on the storage B via the network 500, and the controller 201 of the storage B builds a migration destination virtual storage (virtual storage B) on the storage B using these pieces of information copied from the storage A (S902). To put it concretely, the resource address conversion program 352b reads the resource address management table 372a copied from the storage A, and creates a resource address management table 372b to which a physical WWN (for example, WWN2) different from that in the resource address management table 372a is given. In addition, the port valid/invalid management program 353b reads the WWN management table 373a copied from the storage A, and creates a WWN management table 373b to which a physical WWN (for example, WWN2) different from that in the WWN management table 373a and "Invalid" assigned to Valid/Invalid are given.

As described later, an item assigned to Physical Device Pdev of the resource address management table 372b is set at the timing of when the physical disk is migrated at S904. With this, the resource address management table 372b can be updated using the item assigned to Physical Device Pdev of the actually migrated physical disk.

Afterward, the controller 101 of the storage A and the controller 201 of the storage B perform virtual parity group creation processing for creating a virtual parity group that exists across the storage A and the storage B (S903). The concrete contents of the processing at S903 will be described later.

After the processing at S903 is performed, the controller 101 of the storage A and the controller 201 of the storage B perform processing in which a physical disk for composing the virtual parity group is migrated from the storage A to the storage B (S904). The concrete contents of the processing at S904 will be described later.

And then, the controller 101 of the storage A judges whether or not all the physical disks in its own storage system are migrated to the storage B that is the non-own storage system (S905). If the controller 101 judges that all the physical disks in the storage A are not migrated to the storage B (No at S905), the controller 101 repeats the processing at S904 until all the physical disks are migrated. On the other hand, if the controller 101 judges that all the physical disks in the storage A are migrated to the storage B (Yes at S905), the flow proceeds to S906.

At S906, the host server 300 switches the path from the storage A to the storage B by shifting WWNs (S906). Hereinafter, the processing at S906 will be explained concretely.

For example, if the controller 101 of the storage A judges that all the physical disks have been migrated to the storage B, the controller 101 judges that the storage migration processing has been finished, and changes the item assigned to Valid/Invalid of the WWN management table 373a from "Valid", which is the current condition of the item, to "Invalid". Furthermore, if the controller 201 of the storage B judges that all the physical disks have been migrated from the storage A, the controller 201 judges that the storage migration processing has been finished, and changes the item assigned to Valid/Invalid of the WWN management table 373b from "Invalid", which is the current condition of the item, to "Valid". Successively, the controller 201 informs the host server 300 that the WWN of the storage B becomes valid.

Being informed that the WWN becomes valid from the storage B, the LU path switching program 451 of the host server 300 switches from the path between the host server 300 and the storage A to the path between the host server 300 and the storage B. As described above, if the processing at S906 has been finished, the host server 300 recognizes the storage B via the new path.

Next, at S907, the controller 101 of the storage A eliminates the virtual storage on its own storage system (S907). To put it concretely, the controller 101 eliminates the resource address management table 372a and the WWN management table 373a that are created at S901, and the virtual parity group management table 371a created at S903. When the processing at S907 is finished, the storage migration processing is finished.

As described above, in the storage migration processing, after the virtual parity group that exists across both migration source storage system and migration destination storage system is created at S903 as a parity group for physically migrating the physical disks of the migration source storage system to the migration destination storage system, the physical disks are migrated from the migration source storage system to the migration destination storage system at S904. Therefore, even in the case where the bandwidth of a communication channel between both storage systems is not sufficiently large for a volume to be migrated or even in the case where the size of data held by the migration source storage system is very large, it is avoidable that the migration takes a large amount of time or the maintenance cost increases. In addition, there is no possibility that physical costs increase owing to the necessity of new disks being prepared in the migration destination storage system. Therefore, a storage system can be migrated at a low cost and at a high speed.

Figure 10:
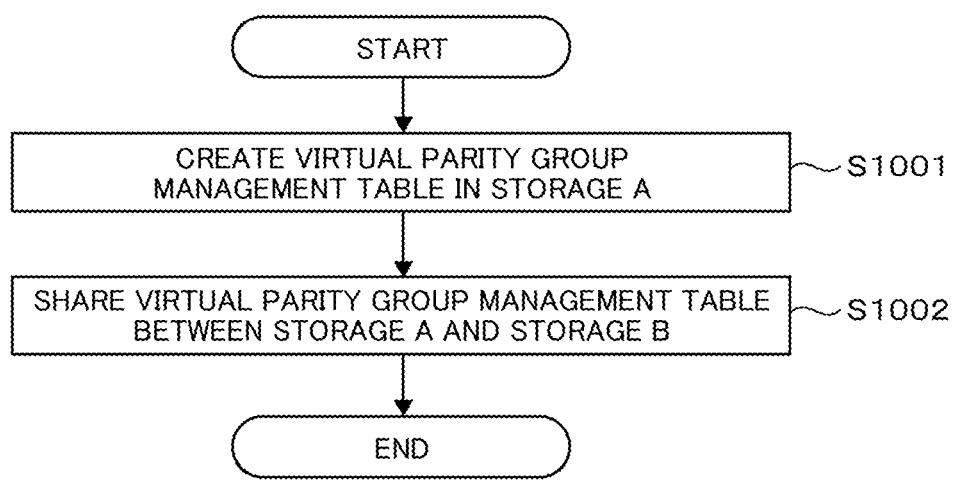
FIG. 10 is a flowchart showing the processing procedure of virtual parity group creation processing.

Successively, the details of the virtual parity group creation processing at S903 will be explained. FIG. 10 is a flowchart showing the processing procedure of the virtual parity group creation processing.

As shown in FIG. 10, in the virtual parity group creation processing, first, the virtual parity group management program 351a of the storage A reads the management information table 801, and creates a virtual parity group management table 371a as shown in FIG. 5A (S1001).

To put it more concretely, the virtual parity group management program 351a sets each item of the virtual parity group management information 3711a about the storage A that is its own storage system. In FIG. 5A, "21", "Pdev1", and "1-5", which are read from the management information table 801, are set to Logical Device Pdev, Physical Device Pdev, and RAID Group Number respectively. Before the migration is performed, since the relevant physical disk in the storage A that is its own storage system is accessible from the host server 300, "Local" and "Valid" are set to Attribute and Valid/Invalid as initial values respectively.

Furthermore, the virtual parity group management program 351a sets initial values to the individual items of the virtual parity group management information 3712a of the storage B that is the non-own storage system. In FIG. 5A, "null" is set to each of the terms of Physical Device Pdev of Storage B and RAID Group Number as an initial value. Before the migration is performed, since physical disks in the storage B that is the non-own storage system are inaccessible from the host server 300, "External" and "Invalid" are set to each item of Attribute and each item of Valid/Invalid as initial values respectively.

Successively, when the processing at S1001 is executed, the virtual parity group management program 351a of the storage A shares the virtual parity group management table with the storage B (S1002). Although described concretely in the following, to share the virtual parity group management table between the migration source storage system and the migration destination storage system means that both virtual parity group management information of the migration source storage system and virtual parity group management information of the migration destination storage system are memorized and held in the shared memory of each of the migration source storage system and the migration destination storage system in such a way that both virtual parity group management information of the migration source storage system and virtual parity group management information of the migration destination storage system can be referred to by both storage systems.

First, the virtual parity group management program 351a transmits the virtual parity group management table 371a created at S1001 to the storage B via the network 500. The virtual parity group management program 351b of the storage B swaps the virtual parity group management information 3711a included in the virtual parity group management table 371a received from the storage A for the virtual parity group management information 3712a, and creates the virtual parity group management table 371b as shown in FIG. 5B.

To put it concretely, the virtual parity group management program 351b reads the virtual parity group management information 3711a of the virtual parity group management table 371a received from the storage A, and sets the read information to the individual items of the virtual parity group management information 3712b of the storage A that is the non-own storage system. At this time, the virtual parity group management program 351b changes each item of Attribute from "Internal" to "External" which shows that the relevant physical disk is a disk existing in the storage A that is the non-own storage system.

In addition, the virtual parity group management program 351b reads the virtual parity group management information 3712a of the virtual parity group management table 371a received from the storage A, and sets the read information to the individual items of the virtual parity group management information 3711b of the storage B that is its own storage system. At this time, the virtual parity group management program 351b changes the item of Attribute to "Local" which shows that the physical disk is a disk existing in the storage B that is its own storage system. Although the above descriptions are made about a certain physical disk in this example, the virtual parity group management information can be shared among all other physical disks stored in the storage A (physical disks identified by "Pdev2" to "Pdev5" of Physical Device Pdev of Storage A).

Here, the processing at S1002 can be realized as another process using the management information table 801. This will be explained concretely below.

First, the virtual parity group management program 351a transmits the management information table 801 to the storage B via the network 500. The virtual parity group management program 351b of the storage B reads the management information table 801 received from the storage A, and creates the virtual parity group management table 371b as shown in FIG. 5B.

To put it more concretely, the virtual parity group management program 351b sets an initial value to each item of the virtual parity group management information 3711b about the storage B that is its own storage system. The virtual parity group management program 351b sets information read from the management information table 801 and initial values to the individual items in the virtual parity group management information 3711b of the storage B that is its own storage system in FIG. 5B. For example, in FIG. 5B, "21", which is read from the management information table 801 and the same item in the storage A, is set to Logical Device Pdev. Furthermore, "null" is set to each of items of Physical Device Pdev of Storage B and RAID Group Number as an initial value. In addition, before the migration is performed, since the relevant physical disk in the storage B that is its own storage system is inaccessible from the host server 300, "Local" and "Invalid" are set to the relevant items of Attribute and Valid/Invalid as initial values respectively.

Furthermore, the virtual parity group management program 351b sets information read from the management information table 801 and initial values to the individual items in the virtual parity group management information 3712b of the storage A that is the non-own storage system. In FIG. 5B, "Pdev1" and "1-5" are set to the relevant terms of Physical Device of Storage A and RAID Group Number of the virtual parity group management information 3712b respectively. In addition, before the migration is performed, since the relevant physical disk in the storage A that is the non-own storage system is accessible from the host server 300, "External" and "Valid" are set to the relevant items of Attribute and Valid/Invalid as initial values respectively. Although the above descriptions are made about a certain physical disk in this example, the virtual parity group management information can be shared about all other physical disks stored in the storage A (disks identified by "Pdev2" to "Pdev5" of Physical Device Pdev of Storage A) in the same way as above using information memorized in the management information tables 801.

After the processing at S1002 is finished, the virtual parity group management table 371a including pieces of the virtual parity group management information about the storage A and the storage B, and the virtual parity group management table 371b including pieces of the virtual parity group management information about the storage B and the storage A are memorized in the shared memory of the storage A and the shared memory of the storage B respectively, so that the virtual parity group that exists across the storage A and the storage B can be created. The migration of a physical disk is accepted on the condition that these virtual parity group management tables are held in the shared memories. The concrete processing for accepting the physical disk will be explained with reference to FIG. 12 and the following drawings.

Figure 11:
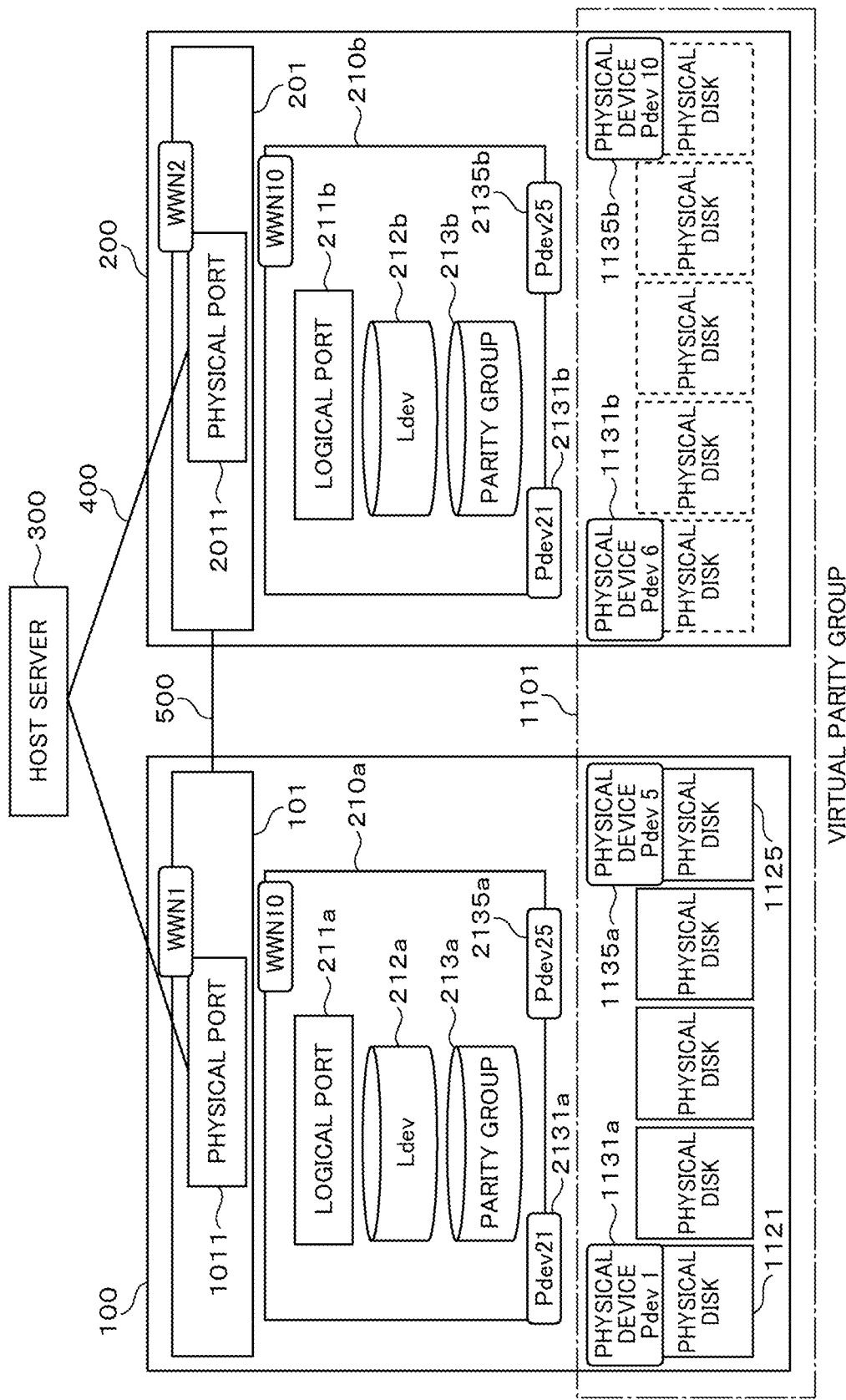
FIG. 11 is a diagram showing an example of a virtual parity group formed across the storage systems.

With this, in the storage A that is the migration source storage system, the virtual parity group management table 371a, in which not only the virtual parity group management information about its own storage system but also the virtual parity group management information about the storage B that is the migration destination storage system are incorporated, is created, and the virtual parity group management table 371a is memorized in the shared memory. On the other hand, in the storage B that is the migration destination storage system, the virtual parity group management table 371b, in which not only the virtual parity group management information about its own storage system but also the virtual parity group management information about the storage A that is the migration source storage system are incorporated using an item of Logical Device Pdev that is the same item of Logical Device Pdev managed in the storage A, is created, and the virtual parity group management table 371b is memorized in the shared memory. With this, as shown in FIG. 11, a virtual parity group 1101 that exists across the virtual storage 210a (storage A) and the virtual storage 210b (storage B) can be formed. In other words, the virtual parity groups in the migration source storage system and in the migration destination storage system are converted into one virtual parity group by associating both virtual parity groups with each other using the shared items of Logical Device Pdev, so that the virtual parity group that exists across both storage system can be built.

In FIG. 11 shows, as an example, that one virtual parity group 1101 is formed by associating five physical devices Pdev "Pdev1" to "Pdev5" defined in the storage A that is the migration source storage system and five physical devices Pdev defined in the storage B that is the migration destination storage system with five shared logical devices Pdev ("Ldev 21" to "Ldev 25"). In FIG. 11, physical disks to be migrated to the storage B are surrounded by dotted lines since these physical disks have not been migrated yet from the storage A to storage B.

Here, in the above-described example, the virtual parity group management information about the storage A in the virtual parity group management table 371b is set by transmitting the management information table 801 to the storage B via the network 500. However, it is also conceivable that, after the physical disks are stored in the drive box 202 of the storage B, the virtual parity group management information about the storage A in the virtual parity group management table 371b is set by reading management information tables 801 held in the stored physical disks.

Subsequently, the processing at S904 will be explained. The processing at S904 is composed of the processing of migrating a physical disk from the storage A to the storage B (migration operation processing), the processing of holding an I/O operation corresponding to a write command in the midst of the migration of the physical disk (write assurance processing), and the processing of holding an I/O operation corresponding to a read command in the midst of the migration of the physical disk (read assurance processing). Hereinafter, concrete explanations will be made, and the virtual parity group management tables of the migration source storage system and the migration destination shared at S903 are updated and held according to the migration status accordingly until the storage system migration is finished.

Figure 12:
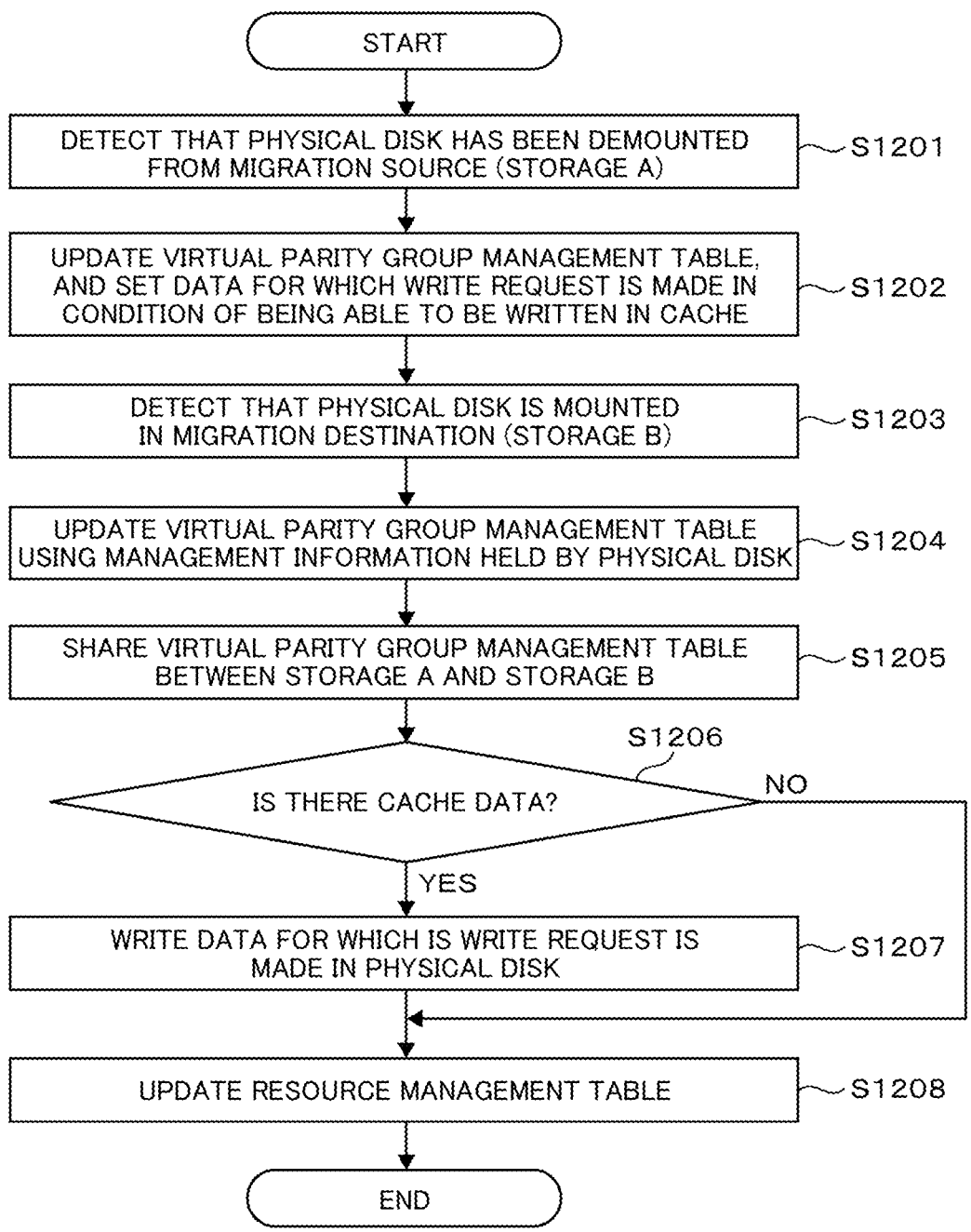
FIG. 12 is a flowchart showing the processing procedure of migration operation processing.

FIG. 12 is a flowchart showing the processing procedure of migration operation processing. As shown in FIG. 12, first, if the virtual parity group management program 351a of the storage A detects that a physical disk is demounted (S1201), the virtual parity group management program 351a updates the relevant virtual parity group management table 371a, and the attribute of a physical device Pdev corresponding to the physical disk the demounting of which is detected is changed from "Local" to "Cache" (S1202).

Figure 13B:
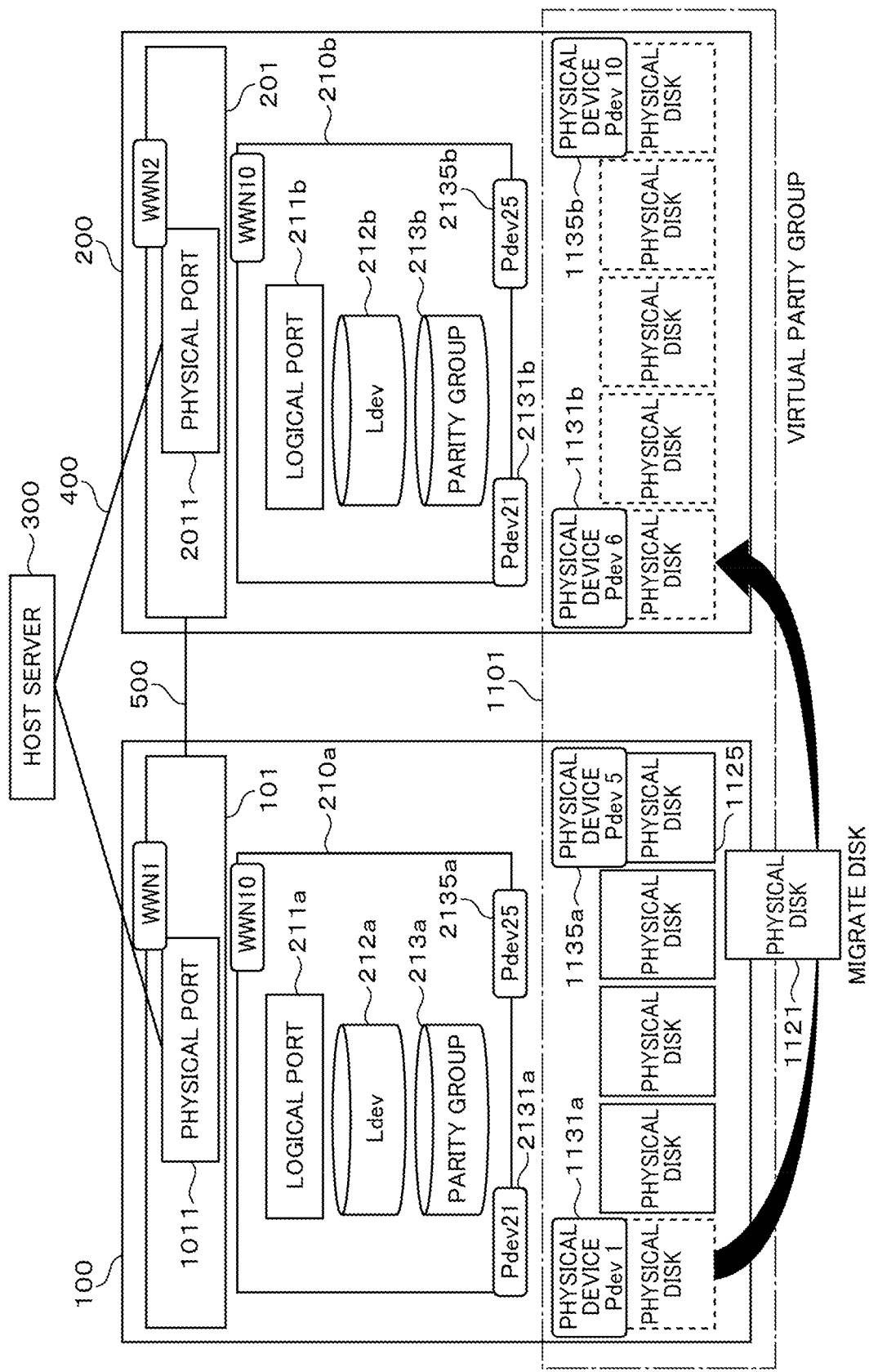
FIG. 13B is a conceptual diagram used for explaining that a physical disk is in the process of being migrated.

FIG. 13A shows an example of the virtual parity group management table 371a updated at S1202, and FIG. 13B is a conceptual diagram used for explaining that the physical disk is in the process of being migrated. As shown in FIG. 13A, in the virtual parity group management table 371a, the attribute of Physical Device Pdev "Pdev1" corresponding to the disk the demounting of which is detected is updated as "Cache" (a record 1301). Furthermore, FIG. 13B shows that the physical disk identified by Physical Device Pdev "Pdev1" has been demounted and being migrated to the storage B. As mentioned above, if a physical disk is being migrated, a write command to the relevant physical disk cannot be executed. Therefore, at the time of the relevant physical disk being migrated, data to be written in the relevant disk is temporarily set in the cache memory 1214 of the controller 101 in a condition of being able to be written at any time as saved data 361 at the time of the write target disk being migrated.

Afterward, when the physical disk that is demounted is mounted on the storage B, the virtual parity group management program 351b detects that the physical disk is mounted (S1203), reads information stored in the management information table 801 held by the mounted physical disk, and updates the virtual parity group management table 371b (S1204).

Figure 14C:
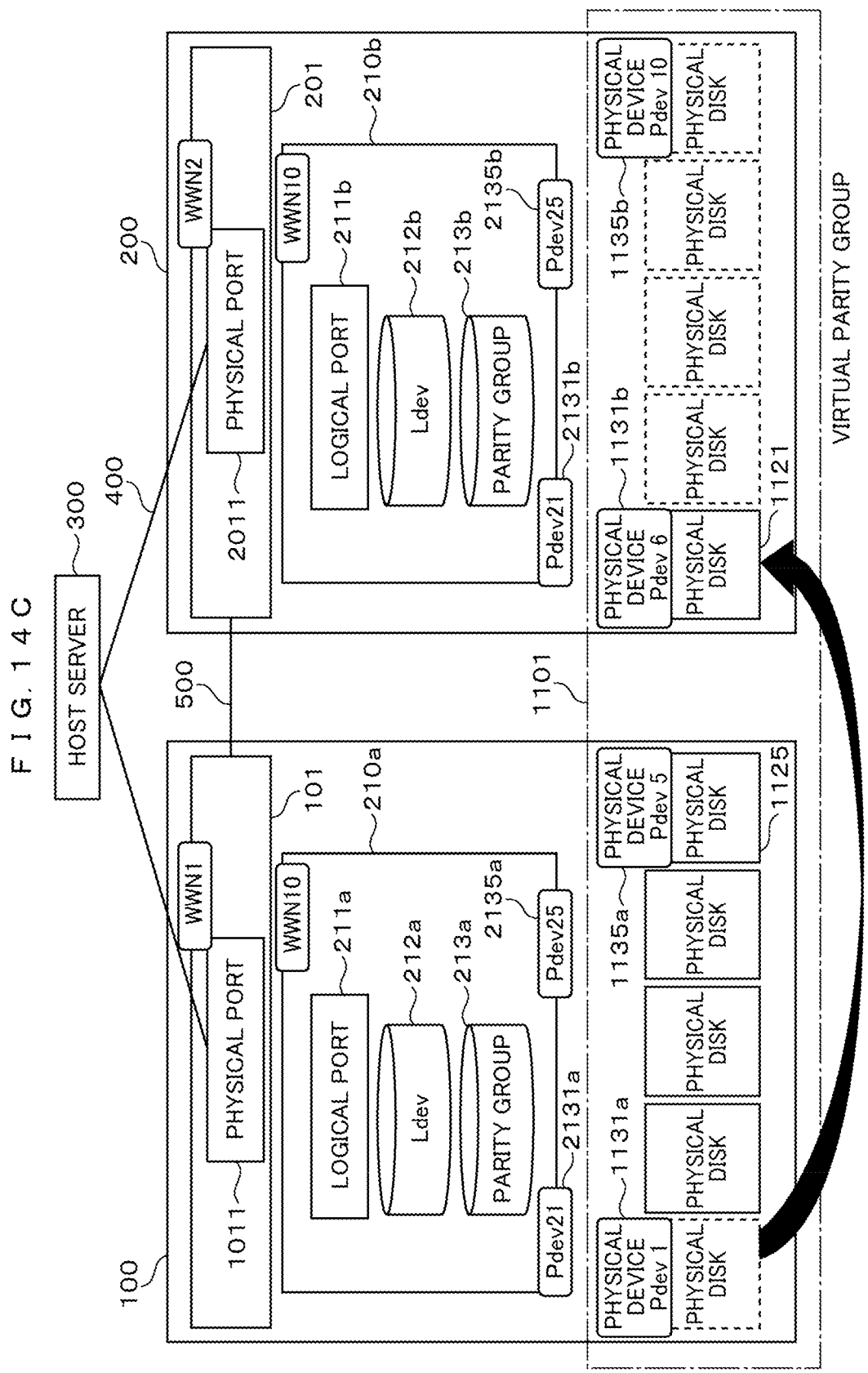
FIG. 14C is a conceptual diagram used for explaining the condition of physical disks after the physical disks are migrated.

FIG. 14A is a diagram showing an example of the virtual parity group management table 371a updated at S1204, FIG. 14B is a diagram showing an example of the virtual parity group management table 371b updated at S1204, and FIG. 14C is a conceptual diagram used for explaining the condition of physical disks after the physical disks are migrated.

As shown in FIG. 14B, the virtual parity group management program 351b reads information memorized in the management information table 801 held by the physical disk the mounting of which is detected, updates items of Physical Device Pdev, RAID Group Number, and Valid/Invalid associated with an item of Logical Device that is the same as an item of Logical Device Pdev included in the read information in the virtual parity group management table 371b, and at the same time, the virtual parity group management program 351b returns items of Physical Device Pdev, RAID Group Number, and Valid/Invalid of the storage A associated with the above item of Logical Device Pdev to their initial values (a record 1401). From the virtual parity group management table 371b shown in FIG. 14A, it can be seen that Physical Device Pdev "Pdev6" of the physical disk the mounting of which is detected is set to Physical Device Pdev of Storage B, "1-5" is set to RAID Group Number, and "INVALID" is set to Valid/Invalid instead of "VALID".

Next, the virtual parity group management program 351b of the storage B transmits Physical Device Pdev "Pdev6" and RAID Group Number "1-5" that are set as above to the storage A via the network 500, so that the set information is fed back to the storage A. The virtual parity group management program 351a of the storage A writes the these received pieces of information in the migration destination virtual parity group management information 3712a of the virtual parity group management table 371a (a record 1402). With this, the migration condition of the physical disk can be shared between the storage A and the storage B (S1205). Although the above descriptions are made about a case of a certain physical disk being migrated in this example, the above-described pieces of processing at S1201 to S1205 are repeated on all other migration target disks.

Subsequently, the virtual parity group management program 351a judges whether or not there is cache data that is written in write assurance processing to be mentioned later in the cache memory 1214 (S1206). To put it concretely, referring to the virtual parity group management table 371a, the virtual parity group management program 351a judges whether or not the attribute of the item of Physical Device Pdev of the storage A corresponding to the above fed-back item of Physical Device Pdev is "Cache". With this, whether or not saved data 361 to be written in a write target physical disk while the relevant physical disk is migrated is memorized in the cache memory 1214 is judged.

If the virtual parity group management program 351a judges that there is not the above cache data (No at S1206), the flow proceeds to S1208. On the other hand, if the virtual parity group management program 351a judges that there is the above cache data (Yes at S1206), the flow proceeds to S1207.

When the virtual parity group management program 351a judges that there is the above cache data (Yes at S1206), the virtual parity group management program 351a transmits the saved data 361 saved at the time of the migration of the write target disk from the cache memory 1214 to the storage B via the network 500. The virtual parity group management program 351b of the storage B writes the saved data 361 that is saved at the time of the write target disk being migrated and received from the storage A in the physical disk a term of Valid/Invalid of which is switched to "VALID" in the virtual parity group management table 371b when the mounting of the physical disk is detected at S1203 (S1207).

The resource address conversion program 352b of the storage B updates the relevant item of Physical Device Pdev of the resource address management table 372 (S1208). As described above, when the mounting of a physical disk is detected, an item of Physical Device Pdev corresponding to the physical disk that is actually migrated is written in the resource address management table 372. The processing at S1208 is finished, the migration operation processing is finished.

Figure 15:
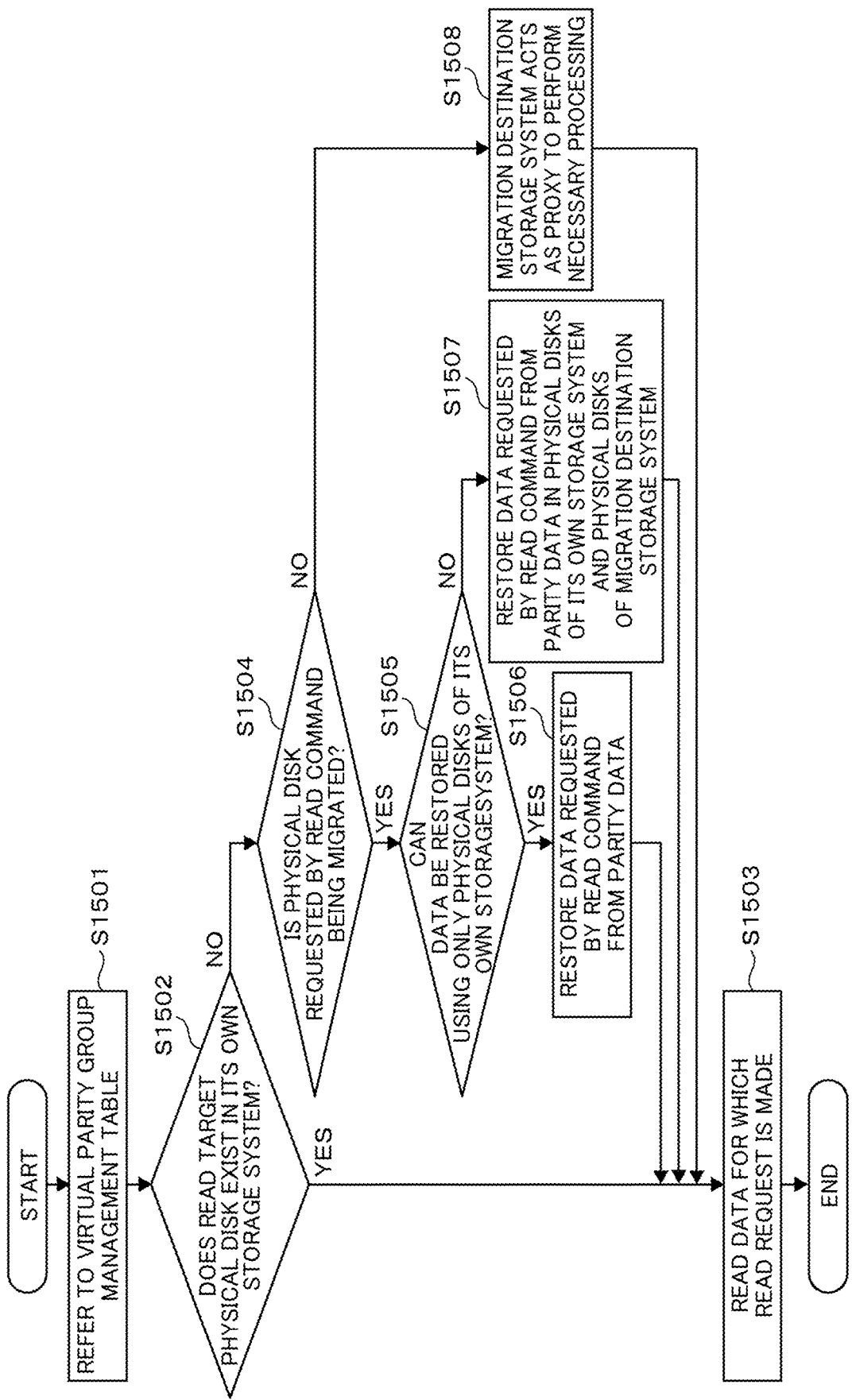
FIG. 15 is a flowchart showing the processing procedure of read assurance processing.

Next, the read assurance processing will be explained. FIG. 15 is a flowchart showing the processing procedure of the read assurance processing. As shown in FIG. 15, the virtual parity group management program 351a refers to the virtual parity group management table 371a (S1501), and judges whether or not a read target physical disk exists in its own storage system (S1502). To put it concretely, the virtual parity group management program 351a judges whether or not the physical disk that stores target data requested by the read command is set as a disk with its attribute "Local" in the virtual parity group management table 371a. The above physical disk can be identified by taking association between Logical Device Pdev and Physical Device Pdev into consideration.

If the virtual parity group management program 351a judges that the physical disk that is requested by the read command exists in its own storage system (Yes at S1502), the virtual parity group management program 351a reads the target data from the physical disk requested by the read command on its own storage system, and transmits the data to the host server 300 (S1503).

On the other hand, if the virtual parity group management program 351a judges that the physical disk that is requested by the read command does not exist in its own storage system (No at S1502), the virtual parity group management program 351a further judges whether or not the relevant disk is being migrated from its own storage system to the non-own storage system (S1504). To put it concretely, the virtual parity group management program 351a judges whether or not the physical disk that stores the target data requested by the read command is set in the virtual parity group management table 371a with its attribute "Cache".

If the virtual parity group management program 351a judges that the above physical disk, which is requested by the read command, is being migrated from its own storage system to the non-own storage system (Yes at S1504), the virtual parity group management program 351a further judges whether or not the target data that is requested by the read command can be restored using only physical disks of its own storage system (S1505). If the virtual parity group management program 351a judges that the above target data can be restored using only physical disks of its own storage system (Yes at S1505), the virtual parity group management program 351a restores and reads the data from parity data memorized in other physical disks of the storage A that compose the same RAID group in cooperation with the physical disk being migrated, and transmits the data to the host server (at S1506 and S1503).

On the other hand, if the virtual parity group management program 351a judges that the above target data cannot be restored using only its own storage system (No at S1505), the virtual parity group management program 351a restores and reads the data from parity data memorized in the other physical disks of the storage A that compose the same RAID group in cooperation with the physical disk being migrated and from parity data from physical disks of the storage B that is the migration destination storage system, and transmits the data to the host server (at S1507 and S1503).

At S1504, if the virtual parity group management program 351a judges that the above disk, which stores the target data requested by the read command, is not being migrated from its own storage system to the non-own storage system (No at S1504), since the target data is stored in the physical disk that has already been migrated to the migration destination storage system, the virtual parity group management program 351a makes the migration destination storage system act as its proxy (S1508), so that the migration destination storage system reads the target data from the physical disk on its own storage system and transmits the data to the host server 300 (S1503).

To put it concretely, the virtual parity group management program 351a informs the storage B of the fact that there is the target data requested by the read command in the storage B, and a term of Logical Device Pdev that is corresponding to the physical disk that is the read target and obtained with reference to the virtual parity group management table 371a at S1501. Upon receiving the relevant notification, the virtual parity group management program 351b of the storage B reads the target data requested by the read command from a physical disk identified by an item of Physical Device Pdev corresponding to the item of Logical Device Pdev received from the storage A. And the virtual parity group management program 351b transmits the read target data to the storage A via the network 500. The virtual parity group management program 351a transmits the above target data received from the storage B to the host server 300. When the processing at S1503 is finished, the read assurance processing is finished.

Performing the read assurance processing in such a way makes it possible that the target data requested by the read command is read and the read target data is transmitted to the host server 300 even if the relevant physical disk is being migrated or has already been migrated. Therefore, a physical disk can be migrated with a data I/O operation between the migration source storage system 100 (or the migration destination storage system 200) and the host server 300 held as it is.

Figure 16:
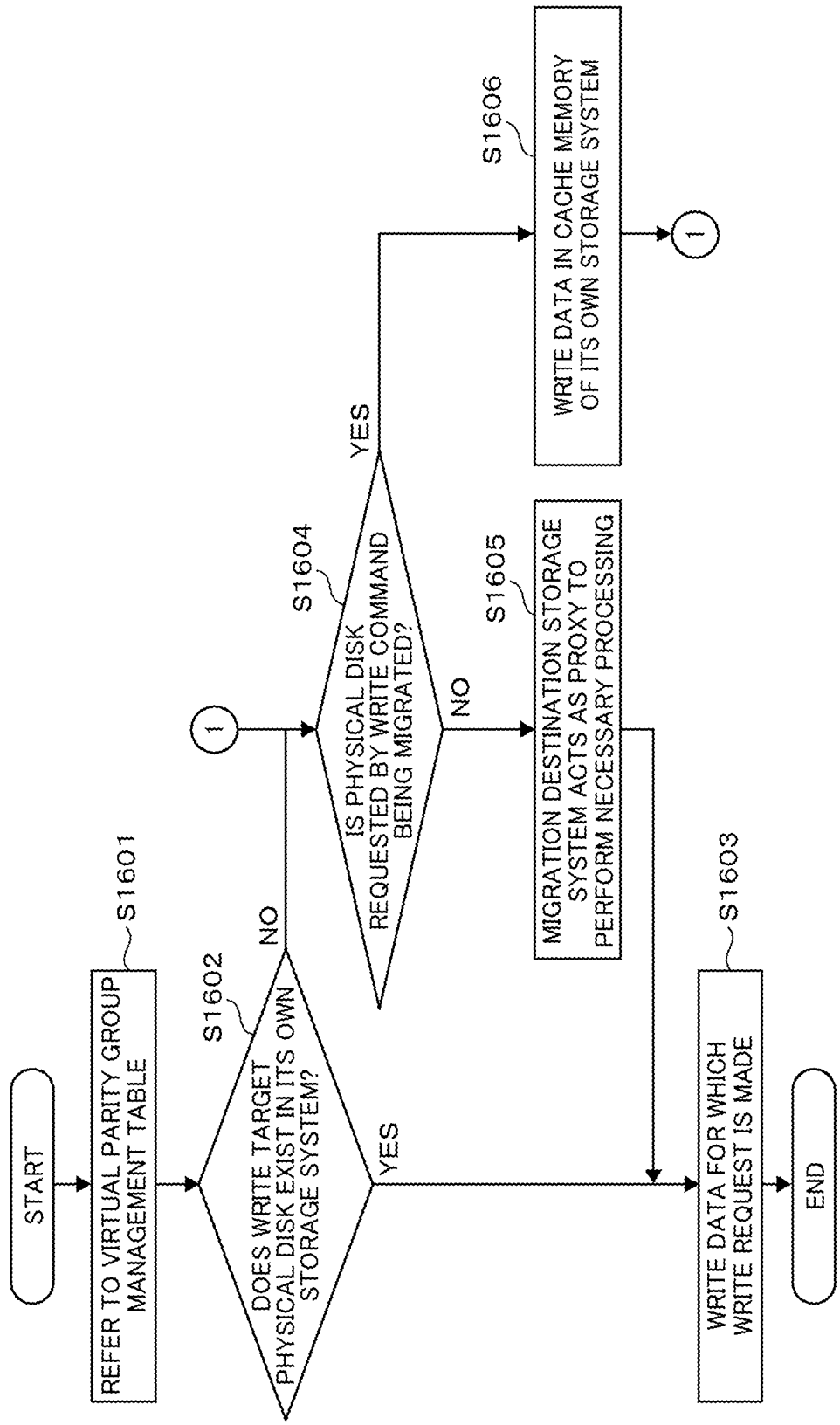
FIG. 16 is a flowchart showing the processing procedure of write assurance processing.

Next, the write assurance processing will be explained. FIG. 16 is a flowchart showing the processing procedure of the write assurance processing. As shown in FIG. 16, the virtual parity group management program 351a refers to the virtual parity group management table 371a (S1601), and judges whether or not a write target physical disk exists in its own storage system (S1602). To put it concretely, the virtual parity group management program 351a judges whether or not the physical disk that stores target data requested by the write command is set as a disk with its attribute "Local" in the virtual parity group management table 371a. The above physical disk can be identified by taking association between Logical Device Pdev and Physical Device Pdev into consideration.

If the virtual parity group management program 351a judges that the write target physical disk exists in its own storage system (Yes at S1602), the virtual parity group management program 351a writes the target data in the physical disk requested by the write command on its own storage system, and transmits the result to the host server 300 (S1603).

On the other hand, if the virtual parity group management program 351a judges that the write target physical disk does not exist in its own storage system (No at S1602), the virtual parity group management program 351a further judges whether or not the relevant disk is being migrated from its own storage system to the non-own storage system (S1604). To put it concretely, the virtual parity group management program 351a judges whether or not the physical disk that is identified by Physical Device Pdev corresponding to Logical Device Pdev requested by the write command is set in the virtual parity group management table 371a with its attribute "Cache".

If the virtual parity group management program 351a judges that the write target physical disk is not being migrated from its own storage system to the non-own storage system (No at S1604), since the target data is stored in the physical disk that has already been migrated to the migration destination storage system, the virtual parity group management program 351a makes the migration destination storage system act as its proxy (S1605), and then the virtual parity group management program 351a makes the migration destination storage system write the target data and transmits the result to the host server 300 (S1603).

To put it concretely, the virtual parity group management program 351a informs the storage B of the fact that there is the target data requested by the write command in the storage B and a term of Logical Device Pdev corresponding to the physical disk that is the write target and obtained with reference to the virtual parity group management table 371a at S1601. Upon receiving the relevant notification, the virtual parity group management program 351b of the storage B writes the target data requested by the write command in a physical disk identified by an item of Physical Device Pdev corresponding to the item of Logical Device Pdev received from the storage A, and informs the storage A of the result via the network 500. The virtual parity group management program 351a transmits the above result received from the storage B to the host server 300.

At S1604, if the virtual parity group management program 351a judges that the write target physical disk is being migrated from its own storage system to the non-own storage system (Yes at S1604), the virtual parity group management program 351a writes the target data requested by the write command in the cache memory 1214 of the controller 101 as saved data 361 at the time of the write target disk being migrated (S1606). When the target data is written in the cache memory 1214 at S1606, the flow gets back to S1604, and the same processing is repeated until the migrations of all write target physical disks are finished. When the migrations of all the write target physical disks are finished (No at S1604), pieces of processing at S1605 and S1603 are executed as described above. When the processing at S1603 is finished, the write assurance processing is finished.

Performing the write assurance processing in such a way makes it possible that the target data requested by the write command is written and the result is transmitted to the host server 300 even if the relevant physical disk is being migrated or has already been migrated. Therefore, a physical disk can be migrated with a data I/O operation between the migration source storage system 100 (or the migration destination storage system 200) and the host server 300 held as it is.

Figure 17:
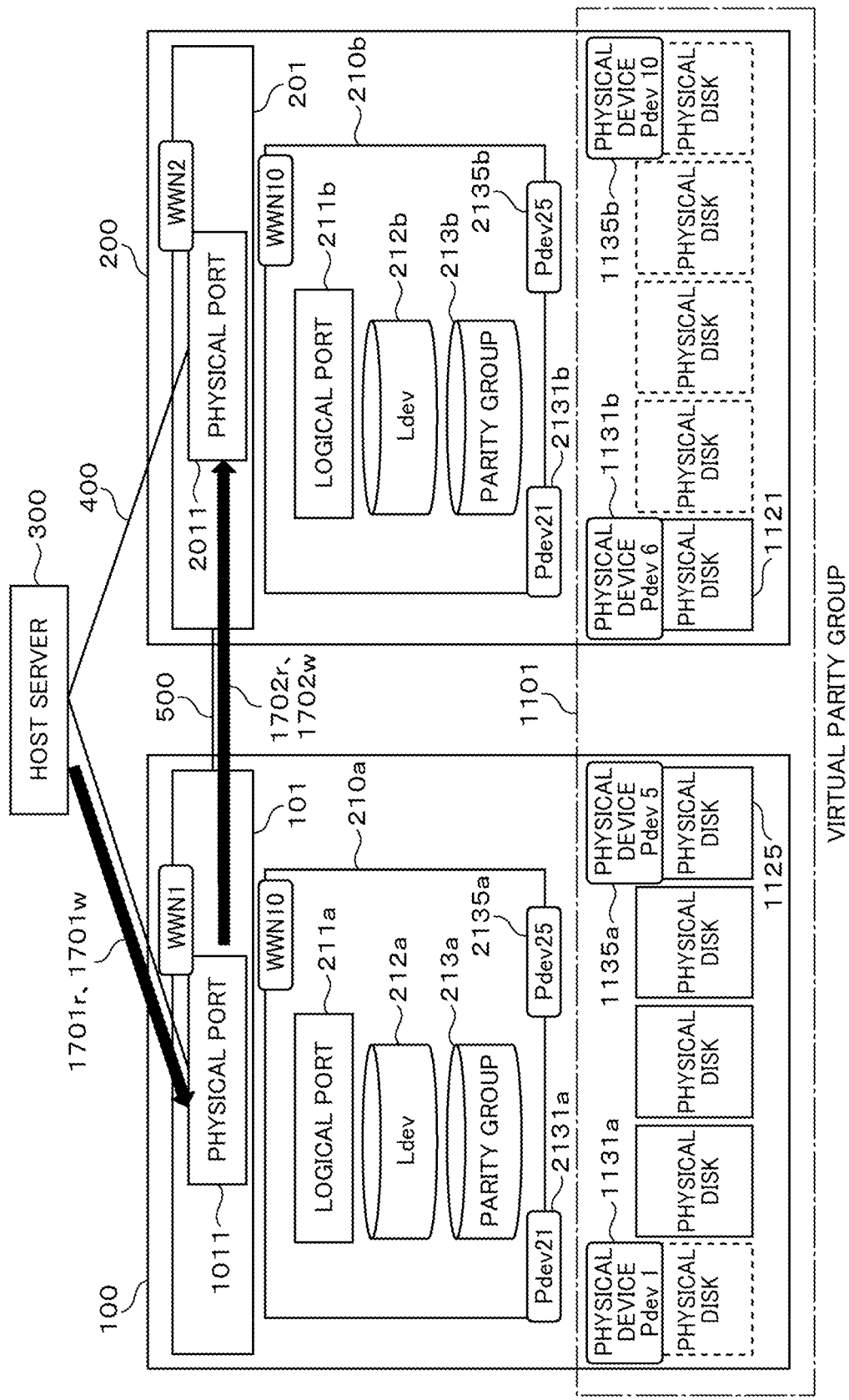
FIG. 17 is a conceptual diagram used for explaining proxy processing (S1508 or S1605 ) performed on target data for which a read request or a write request is made.

FIG. 17 is a conceptual diagram used for explaining proxy processing (S1508 or S1605) performed on target data for which a read request or a write request is made. As shown in FIG. 17, receiving a read request 1701r or a write request 1701w from the host server 300 via the HBA 311, the virtual parity group management program 351a refers to the virtual parity group management table 371a as described at S1501 and S1601. In addition, as described at S1504 and S1604, upon confirming that a physical disk in which target data is memorized has been migrated to the migration destination storage system, the virtual parity group management program 351a transmits a read proxy request 1702r or a write proxy request 1702w to the storage B via the network 500 and makes the storage B perform read processing or write processing as explained at S1508 and S1605.

As described above, the present embodiment has proposed a storage system 1000 including a first storage system (for example, the storage A) that is a migration source virtual storage system and a second storage system (for example, the storage B) that is a migration destination virtual storage system, in which the first storage system includes a first memory section (for example, the shared memory 1314) that can be shared with the second storage system, and a first virtual parity group management section (for example, the virtual parity group management program 351a) that creates a first virtual parity group management table (for example, the virtual parity group management table 371a) that associates first virtual parity group management information (for example, the virtual parity group management information 3711a) that shows the logical and physical configurations of the first storage system that is its own storage system with second virtual parity group management information (for example, the virtual parity group management information 3712a) that shows the logical and physical configurations of the second storage system that is the non-own storage system using physical disk management information (for example, the management information table 801) for associating logical device information (for example, Logical Device Pdev), physical device information (for example, Physical Device Pdev), and the parity information of logical devices (for example, RAID Group Number) identified by the logical device information with one another, and memorizes the first virtual parity group management table in the first memory section; the second storage system includes a second memory section (for example, the shared memory 1314) that can be shared with the first storage system and a second virtual parity group management section (for example, the virtual parity group management program 351b) that creates a second virtual parity group management table (for example, the virtual parity group management table 371b) that associates the logical device information, third virtual parity group management information (for example, the virtual parity group management information 3711b) that sets the second virtual parity group management information to virtual parity group management information regarding its own storage system, and fourth virtual parity group management information (for example, the virtual parity group management information 3712b) that sets the first virtual parity group management information to virtual parity group management information regarding the non-own storage system with one another, and memorizes the second virtual parity group management table in the second memory section; and the storage system accepts the migration of a physical disk on the condition that the first virtual parity group management table is memorized in the first memory section and the second virtual parity group management table is memorized in the second memory section, that is to say, the migration of a physical disk is accepted on the condition that a virtual parity group is formed across the migration source storage system and the migration destination storage system using the virtual parity group management table having logical device information shared between the migration source storage system and the migration destination storage system. Therefore, a storage system can be replaced at a low cost and at a high speed.

Furthermore, in the storage system 1000, the disk management information is memorized in the physical disk, and when the physical disk is stored in the second storage system, the second virtual parity group management section reads the disk management information of the stored physical disk, and updates the second virtual parity group management table. Therefore, only physically migrating a disk makes it possible to bring in the configuration information of a virtual parity group and the like in the migration destination storage system from the migration source storage system.

In addition, in the storage system 1000, when the second virtual parity group management section receives the physical disk management information from the first storage system (for example, via the network 500), the second virtual parity group management section reads the received physical disk management information, and updates the second virtual parity group management table. Therefore, only exchanging the physical disk management information between the migration source storage system and the migration destination storage system makes it possible to bring in the configuration information of the virtual parity group and the like in the migration destination storage system from the migration source storage system.

Furthermore, in the storage system 1000, as explained at S1502 to S1506, and S1507 in FIG. 15, when there is not a physical disk to which a read request is made in its own storage system and the physical disk is being migrated, the first virtual parity group management section restores data, for which the read request is made, from the parity data of another physical disk that is composed of the same parity information as that of the physical disk to which the read request is made. Therefore, even if a physical disk to which a read request is made is being migrated, the continuation of an I/O operation for the read command can be assured.

In addition, in the storage system 1000, as explained at S1502 to S1508 in FIG. 15, when there is not a physical disk to which a read request is made in its own storage system and the physical disk is not being migrated (in other words, it is judged that the physical disk has already been migrated), the first virtual parity group management section restores data, for which the read request is made, from the physical disk that has already been migrated to the second storage system. Therefore, even if a physical disk to which a read request is made has already been migrated, the continuation of the I/O operation for the read command can be assured.

Furthermore, in the storage system 1000, as explained at S1602 to S1606 in FIG. 16, when there is not a physical disk, in which data for which a write request is made is to be written, in its own storage system and the physical disk is being migrated, the first virtual parity group management section writes the data, for which the write request is made, in the temporal memory section (for example, the cache memory 1214) of the first storage system. Therefore, even if a physical disk to which a write request is made is being migrated, the continuation of an I/O operation for the write command can be assured.

In addition, in the storage system 1000, as explained at S1602 to S1605 in FIG. 16, when there is not a physical disk, in which data for which a write request is made is to be written, in its own storage system and the physical disk is not being migrated (in other words, it is judged that the physical disk has already been migrated), the first virtual parity group management section writes the data, for which the write request is made, in the physical disk that has already been migrated to the second storage system. Therefore, even if a physical disk to which a write request is made has already been migrated, the continuation of the I/O operation for the write command can be assured.

As described above, according to the storage system of the present embodiment, even in the case where if the bandwidth of a communication channel for migration is not sufficiently large or new disks cannot be prepared in a migration destination storage system, a storage system migration can be performed at a low cost and at a high speed.

What is claimed is:

1. A storage system comprising:
    a first storage system that is a migration source virtual storage system; and
    a second storage system that is a migration destination virtual storage system,
    wherein the first storage system includes
        a first memory section that can be shared with the second storage system, and
        a first virtual parity group management section that creates a first virtual parity group management table that associates first virtual parity group management information that shows logical and physical configurations of the first storage system that is its own storage system with second virtual parity group management information that shows logical and physical configurations of the second storage system that is a non-own storage system using physical disk management information for associating logical device information, physical device information, and parity information of logical devices identified by the logical device information with one another, and memorizes the first virtual parity group management table in the first memory section;
    the second storage system includes
        a second memory section that can be shared with the first storage system, and
        a second virtual parity group management section that creates a second virtual parity group management table that associates the logical device information, third virtual parity group management information that sets the second virtual parity group management information to virtual parity group management information regarding its own storage system, and fourth virtual parity group management information that sets the first virtual parity group management information to virtual parity group management information regarding the non-own storage system with one another, and memorizes the second virtual parity group management table in the second memory section; and
    the storage system accepts migration of a physical disk on the condition that the first virtual parity group management table is memorized in the first memory section and the second virtual parity group management table is memorized in the second memory section.

2. The storage system according to claim 1, wherein the disk management information is memorized in the physical disk, and when the physical disk is stored in the second storage system, the second virtual parity group management section reads the disk management information of the stored physical disk, and updates the second virtual parity group management table.

3. The storage system according to claim 1, wherein when the second virtual parity group management section receives the physical disk management information from the first storage system, the second virtual parity group management section reads the received physical disk management information, and updates the second virtual parity group management table.

4. The storage system according to claim 1, wherein when there is not a physical disk to which a read request is made in its own storage system and the physical disk is being migrated, the first virtual parity group management section restores data, for which the read request is made, from the parity data of another physical disk that is composed of the same parity information as that of the physical disk to which the read request is made.

5. The storage system according to claim 1, wherein when there is not a physical disk to which a read request is made in its own storage system and the physical disk is not being migrated, the first virtual parity group management section reads data, for which the read request is made, from a physical disk that has already been migrated to the second storage system.

6. The storage system according to claim 1, wherein when there is not a physical disk, in which data for which a write request is made is to be written, in its own storage system and the physical disk is being migrated, the first virtual parity group management section writes the data, for which the write request is made, in a temporal memory section of the first storage system.

7. The storage system according to claim 1, wherein when there is not a physical disk, in which data for which a write request is made is to be written, in its own storage system and the physical disk is not being migrated, the first virtual parity group management section writes the data, for which the write request is made, in a physical disk that has already been migrated to the second storage system.

8. A migration method of a storage system performed in the storage system including a first storage system that is a migration source virtual storage system and a second storage system that is a migration destination virtual storage system, the migration method comprising the steps of:
    creating a first virtual parity group management table that associates first virtual parity group management information that shows logical and physical configurations of the first storage system that is its own storage system with second virtual parity group management information that shows logical and physical configurations of the second storage system that is a non-own storage system using physical disk management information for associating logical device information, physical device information, and parity information of logical devices identified by the logical device information with one another,
    memorizing the created first virtual parity group management table in a first memory section that can be shared with the second storage system;
    creating a second virtual parity group management table that associates the logical device information, third virtual parity group management information that sets the second virtual parity group management information to virtual parity group management information regarding its own storage system, and fourth virtual parity group management information that sets the first virtual parity group management information to virtual parity group management information regarding the non-own storage system with one another, memorizing the created second virtual parity group management table in a second memory section that can be shared with the first storage system; and accepting migration of a physical disk on the condition that the first virtual parity group management table is memorized in the first memory section and the second virtual parity group management table is memorized in the second memory section.

9. The migration method of a storage system according to claim 8, wherein the disk management information is memorized in the physical disk, and when the physical disk is stored in the second storage system, it is read the disk management information of the stored physical disk, and updated the second virtual parity group management table.

10. The migration method of a storage system according to claim 8, wherein when it is received the physical disk management information from the first storage system, it is read the received physical disk management information, and updated the second virtual parity group management table.

11. The migration method of a storage system according to claim 8, wherein when there is not a physical disk to which a read request is made in its own storage system and the physical disk is being migrated, it is restored data, for which the read request is made, from the parity data of another physical disk that is composed of the same parity information as that of the physical disk to which the read request is made.

12. The migration method of a storage system according to claim 8, wherein when there is not a physical disk to which a read request is made in its own storage system and the physical disk is not being migrated, it is read data, for which the read request is made, from a physical disk that has already been migrated to the second storage system.

13. The migration method of a storage system according to claim 8, wherein when there is not a physical disk, in which data for which a write request is made is to be written, in its own storage system and the physical disk is being migrated, it is written the data, for which the write request is made, in a temporal memory section of the first storage system.

14. The migration method of a storage system according to claim 8, wherein when there is not a physical disk, in which data for which a write request is made is to be written, in its own storage system and the physical disk is not being migrated, it is written the data, for which the write request is made, in a physical disk that has already been migrated to the second storage system.

\* \* \* \* \*